US012719066B2

(12) United States Patent
Yoshitomi et al.

(10) Patent No.: US 12,719,066 B2
(45) Date of Patent: Aug. 25, 2026

(54) FUEL CELL SYSTEM

(71) Applicant: HONDA MOTOR CO., LTD., Tokyo (JP)

(72) Inventors: Ryoichi Yoshitomi, Saitama (JP); Takahiro Nagano, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 800 days.

(21) Appl. No.: 18/301,262

(22) Filed: Apr. 17, 2023

(65) Prior Publication Data

US 2023/0352706 A1 Nov. 2, 2023

(30) Foreign Application Priority Data

Apr. 28, 2022 (JP) ................................ 2022-074803

(51) Int. Cl.
*H01M 8/04007* (2016.01)
*H01M 8/04014* (2016.01)
*H01M 8/04029* (2016.01)
*H01M 8/0432* (2016.01)

(52) U.S. Cl.
CPC ... *H01M 8/04074* (2013.01); *H01M 8/04014* (2013.01); *H01M 8/04029* (2013.01); *H01M 8/04335* (2013.01)

(58) Field of Classification Search
CPC ......... H01M 8/04007; H01M 8/04014; H01M 8/04029; H01M 8/04059; H01M 8/0267; H01M 8/04074
See application file for complete search history.

(56) References Cited

U.S. PATENT DOCUMENTS

2010/0273079 A1* 10/2010 Hinsenkamp ..... H01M 8/04059 429/442
2024/0178418 A1* 5/2024 Kemmer ........... H01M 8/04253

FOREIGN PATENT DOCUMENTS

JP S63133461 A 6/1988
JP H0482167 A 3/1992
JP 2000164236 A 6/2000
(Continued)

OTHER PUBLICATIONS

Machine Translation: JP-2003123815-A, Matsui Nobuki, (Year: 2026).*
(Continued)

*Primary Examiner* — Kendra Ly
(74) *Attorney, Agent, or Firm* — CKC & Partners Co., LLC

(57) ABSTRACT

The present invention has an object of, without harming the manufacturability of a fuel cell system, and without increasing pressure loss of oxidant gas, enabling to layout heat exchangers of a cathode system in parallel. The fuel cell system includes a stack, anode system, cathode system and cooling system. The cathode system supplies oxidant gas to the stack in which fuel cells are laminated. The cooling system includes a plurality of heat exchangers which exchange heat between the oxidant gas and coolant. The plurality of heat exchangers is arranged in parallel in the cathode system. The cathode system includes a branching part which is more to an upstream side than each of the heat exchangers, and includes a merging part which is more to a downstream side than each of them. The heat exchangers are installed to be shifted from each other in each direction among up/down, front/rear and left/right.

4 Claims, 23 Drawing Sheets

(56) References Cited

FOREIGN PATENT DOCUMENTS

| | | | | |
|---|---|---|---|---|
| JP | 2003123815 A | * | 4/2003 |
| JP | 2009187779 A | * | 8/2009 |
| JP | 2016177883 A | | 10/2016 |
| JP | 2021141055 A | | 9/2021 |
| JP | 2021150156 A | | 9/2021 |

OTHER PUBLICATIONS

Machine Translation: JP-2009187779-A, Matsumoto Satoshi, (Year: 2026).*

Notification of Reasons for Refusal issued in the JP Patent Application No. 2022-074803, mailed on Dec. 19, 2023.

* cited by examiner

FIG. 1

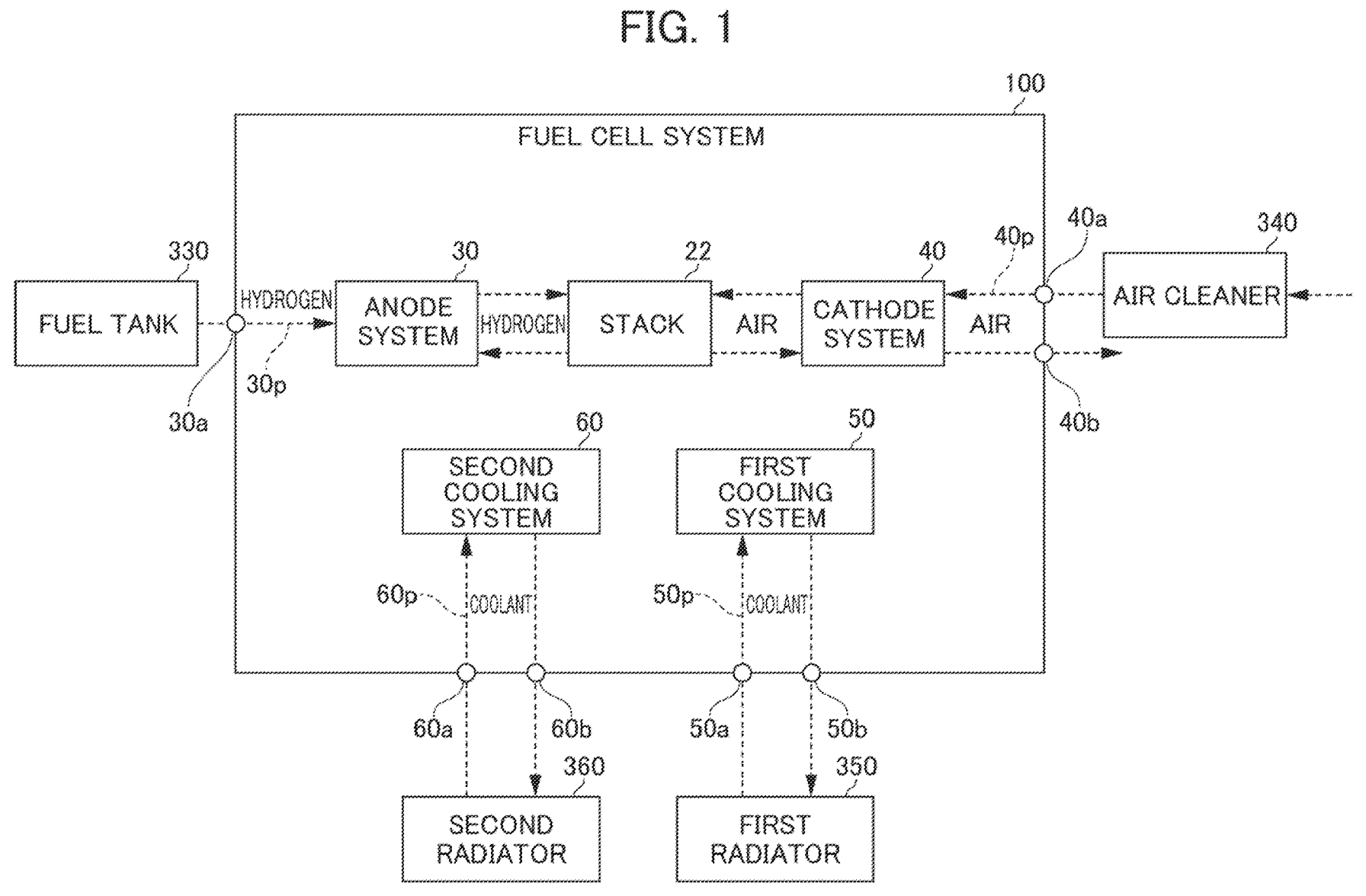

FUEL CELL SYSTEM
100
FUEL TANK
330
30a
30p
HYDROGEN
ANODE SYSTEM
30
HYDROGEN
STACK
22
AIR
CATHODE SYSTEM
40
AIR
40p
40a
40b
AIR CLEANER
340
FIRST COOLING SYSTEM
50
COOLANT
50p
50a
50b
FIRST RADIATOR
350
SECOND COOLING SYSTEM
60
COOLANT
60p
60a
60b
SECOND RADIATOR
360

100
FIRST HEAT EXCHANGER
54
50
40b
PERIPHERAL DEVICE
25
PUMP DRIVE DEVICE
41
50b
FIRST RADIATOR
20
SENSOR BOARD
STACK
MIXING VALVE
52
FILTER
58
WATER PUMP
57
50a
350
40p
40
60
60p
26
50
50p
AIR PUMP
42
22
40a
64B
SECOND HEAT EXCHANGER
45
43
64A
SECOND HEAT EXCHANGER
63
65
60b
60a
AIR CLEANER
340
360
SECOND RADIATOR

AIR CLEANER
340
341
341
342
342
40a
40a
41
41
42
42
100
100
500
S
R
L
Fr
Fr
Rr
Rr

AIR CLEANER
340
341
341
342
342
42aL
42aL
40a
40a
40a
40p
40p
42
42
42a
42a
41
41
100
100
500
S
R
L
Fr
Rr

AIR CLEANER
340
341
341
S
100
100
41
41
42
42
500
R
Fr
Rr
R
Fr
Rr

AIR CLEANER
340
341
341
100
100
500
41
41
42
42
S
Rr
R
L
Fr
Rr
R
L
Fr

FUEL CELL SYSTEM

This application is based on and claims the benefit of priority from Japanese Patent Application No. 2022-074803, filed on 28 Apr. 2022, the content of which is incorporated herein by reference.

BACKGROUND OF THE INVENTION

Field of the Invention

The present invention relates to a fuel cell system including a fuel cell and peripheral structure thereof.

Related Art

In recent years, the development of fuel cell systems has been advancing from the viewpoint of decreasing the emission of carbon dioxide, reducing the negative impact on the global environment, etc.

Patent Document 1: Japanese Unexamined Patent Application, Publication No. 2021-141055

SUMMARY OF THE INVENTION

A fuel cell system includes, for example, a stack in which fuel cells are laminated, an anode system that supplies fuel gas to the stack, a cathode system that supplies oxidant gas to the stack, and a cooling system. The cooling system includes, for example, a heat exchanger which exchanges heat between the oxidant gas and coolant.

The present inventors considered to provide a plurality of heat exchangers in parallel in the cathode system. In this case, a branching part will be provided more to an upstream side than each heat exchanger, and a merging part will be provided more to a downstream side than each heat exchanger. In this case, from the aspect of manufacturability, it is preferable for the length of a pipe from the branching part to each heat exchanger in the cathode system, and the length of the pipe from each heat exchanger to the merging part to be sufficiently secured without waste. Furthermore, it is preferable to equalize the length of the pipe on the side of one heat exchanger and the length of the pipe on the side of another heat exchanger, or adjust them to a desired length, so that the pressure loss in the pipe on the side of one heat exchanger and the pressure drop in the pipe on the side of another heat exchanger are equal.

However, for these purposes, if two pipes branching and extending from the branching part and two pipes merging at the merging part curve at a wasteful angle, there is concern over the manufacturability of the fuel cell system being impaired, and pressure loss of oxidant gas increasing.

The present invention has been made taking account of the above situation, and has an object of, without impairing manufacturability of the fuel cell system, and without increasing the pressure loss of oxidant gas, enabling to lay out heat exchangers in a cathode system in parallel.

The present inventors have found that, when installing heat exchangers to be shifted from each other in the respective directions of up/down, front/rear and left/right, it is possible to efficiently layout the pipes of the cathode system without impairing the manufacturability of the fuel cell system, or increasing the pressure loss of oxidant gas. The present invention provides a fuel cell system of the configurations of the following first to fourth aspects.

According to a first aspect of the present invention, a fuel cell system includes: a stack in which fuel cells are laminated; an anode system which supplies fuel gas to the stack; a cathode system which supplies oxidant gas to the stack; and a cooling system, in which the cooling system includes a plurality of heat exchangers which exchange heat between the oxidant gas and coolant, and each of the heat exchangers is a member independent from another of the heat exchangers, a plurality of the heat exchangers is disposed in parallel in the cathode system, and the cathode system includes a branching part which is more to an upstream side than each of the heat exchangers, and includes a merging part which is more to a downstream side than each of the heat exchangers, and the heat exchangers are installed to be shifted from each other in each direction of a vertical direction, a front/rear direction as a longitudinal direction of the fuel cell system in a top view, and a left/right direction as a horizontal direction orthogonal to the front/rear direction.

According to the present configuration, two heat exchangers are shifted in the respective directions of up/down, front/rear and left/right from each other. The length of pipe from the branching part to each heat exchanger, and the length of pipe from each heat exchanger to the merging part tend to be sufficiently secured without hardship. Furthermore, by staggering in each of these directions, the length of pipe on the side of one heat exchanger and the length of pipe on the side of another heat exchanger are tend to be equalized without hardship, or adjusted to the desired lengths without hardship. It is thereby possible to suppress the two pipes branching and extending from the branching part, and the pipes merging at the merging part from bending at an unreasonable angle. For this reason, it is possible to efficiently layout the cathode system pipe without impairing the manufacturability of the fuel cell system, and increasing the pressure loss of oxidant gas.

According to a second aspect of the present invention, in the fuel cell system as described in the first aspect, distances from the branching part to each of the heat exchangers along a pipe of the cathode system are equal to each other.

According to the present configuration, it is possible to efficiently equalize the pressure loss of oxidant gas from the branching part to each heat exchanger.

According to a third aspect of the present invention, in the fuel cell system as described in the first or second aspect, distances from each of the heat exchangers to the merging part along a pipe of the cathode system are equal to each other.

According to the present configuration, it is possible to efficiently equalize the pressure loss of oxidant gas from each heat exchanger to the merging part.

According to a fourth aspect of the present invention, in the fuel cell system as described in the first or second aspect, distances from the branching part through each of the heat exchangers to reaching the merging part along a pipe of the cathode system are equal to each other.

According to the present configuration, it is possible to efficiently equalize pressure drop of oxidant gas in each pathway.

According to the configuration of the first aspect as above, it is possible to layout heat exchangers in the cathode system in parallel, without impairing the manufacturability of the fuel cell system, or increasing the pressure loss of oxidant gas. Furthermore, according to the configurations of the second to fourth aspects citing the first aspect, each of the additional effects can be obtained.

BRIEF DESCRIPTION OF THE DRAWINGS

FIG. 1 is a block diagram showing a fuel cell system of the present embodiment.

FIG. 5 is a block diagram showing a second cooling system.

FIG. 15 is a perspective view showing the fuel cell system obliquely from below.

DETAILED DESCRIPTION OF THE INVENTION

Figure 2:
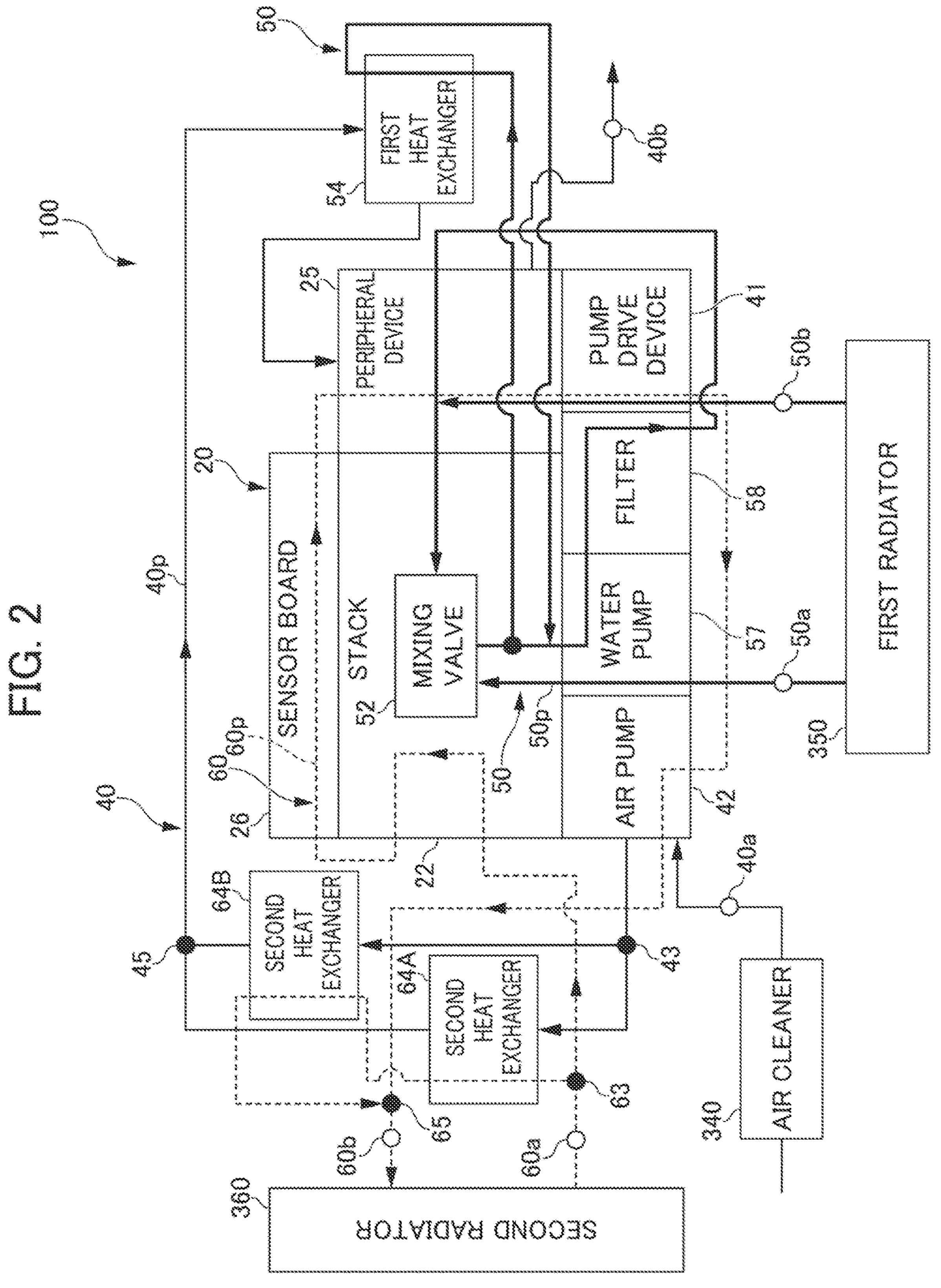
FIG. 2 is a block diagram showing a cathode system and cooling system of the fuel cell system.

Hereinafter, embodiments of the present invention will be explained while referencing the drawings. However, the present invention is not to be limited in any way to the below embodiments, and can be implemented by modifying as appropriate within a scope not departing from the gist of the invention.

First Embodiment

FIG. 1 is a block diagram showing a fuel cell system 100 of the present embodiment. The fuel cell system 100 is equipped to an electric vehicle, and supplies electricity to a motor, etc. for vehicle travel. The fuel cell system 100 includes a stack 22, an anode system 30, a cathode system 40, a first cooling system 50, and a second cooling system 60. Hereinafter, a side end part of the fuel cell system 100 is referred to as "system side face".

The stack 22 includes a plurality of fuel cells which are laminated, and a casing which accommodates these fuel cells. The fuel cell includes an electrolyte film, a cathode electrode and an anode electrode. The cathode electrode and anode electrode sandwich the electrolyte film.

The anode system 30 has an anode system pipe 30*p* for supplying hydrogen as fuel gas to the anode electrode. The anode system 30 has an anode system intake port 30*a* as an upstream end of the anode system pipe 30*p* in the system side face. A fuel tank 330 storing hydrogen is connected to the anode system intake port 30*a*. The anode system 30 humidifies hydrogen supplied from the fuel tank 330 to the anode system intake port 30*a*, and then supplies the hydrogen to the anode electrode.

The cathode system 40 has a cathode system pipe 40*p* for supplying air as oxidant gas to the cathode electrode. The cathode system 40 has, at the system side face, a cathode system intake port 40*a* as an upstream end of the cathode system pipe 40*p*, and a cathode system exhaust port 40*b* as a downstream end of the cathode system pipe 40*p*. An air cleaner 340 is connected to the cathode system intake port 40*a*. The cathode system 40 humidifies the air passing through the air cleaner 340 to the cathode system intake port 40*a*, and then supplies the air to the cathode electrode.

In the fuel cells within the stack 22, hydrogen supplied to the anode electrode and oxygen in the air supplied to the cathode electrode are consumed by the electrochemical reaction, whereby power generation is performed. Accompanying this, water is produced at the cathode electrode. The cathode system 40 discharges at least part by part of air having passed through the cathode electrode and water produced by the cathode electrode to outside of the fuel cell system 100 from the cathode system exhaust port 40*b*.

The first cooling system 50 cools a first cooling target, and the second cooling system 60 cools a second cooling target. Each cooling target of the first cooling target and second cooling target includes at least either one among the stack 22, anode system 30 and cathode system 40. More specifically, in the present embodiment, each cooling target includes the stack 22 and cathode system 40.

The first cooling system 50 is a cooling system for temperature control which cools so as to make the first cooling target approach the target temperature. The second cooling system 60 is a cooling system for cooling only which cools the second cooling target so that the temperature lowers as much as possible.

The first cooling system 50 has a first cooling system pipe 50*p* that sends cooling water as coolant to cool the first cooing target. The first cooling system 50, in a system side face, has a first cooling system inflow port 50*a* as an upstream end of the first cooling system pipe 50*p*, and a first cooling system outflow port 50*b* as a downstream end of the first cooling system pipe 50*p*. A first radiator 350 is connected to the first cooling system inflow port 50*a* and first cooling system outflow port 50*b*. The first cooling system 50 cools the first cooling target by circulating the cooling water between the first cooling target and the first radiator 350.

The second cooling system 60 has a second cooling system pipe 60*p* which sends cooling water as coolant to cool the second cooling target. The second cooling system 60, in a system side face, has a second cooling system inflow port 60*a* as an upstream end of a second cooling system pipe 60*p*, and a second cooling system outflow port 60*b* as a downstream end of the second cooling system pipe 60*p*. A second radiator 360 different from the first radiator 350 previously mentioned is connected to the second cooling system inflow port 60*a* and second cooling system outflow port 60*b*. The second cooling system 60 cools the second cooling target by circulating the cooling water between the second cooling target and the second radiator 360.

Hereinafter, the first cooling system 50 and second system 60 are collectively referred as "cooling system 50, 60", and the first cooling system pipe 50*p* and second cooling system pipe 60*p* are collectively referred to as "cooling system pipe 50*p*, 60*p*".

FIG. 2 is a block diagram showing the cathode system 40, first cooling system 50 and second cooling system 60. The stack assembly 20 has the stack 22, peripheral device 25, sensor board 26, etc.

The cathode system 40 has an air pump 42, pump drive device 41, etc. The air pump 42 is a pump for feeding air from the upstream side to the downstream side within the cathode system 40. The pump drive device 41 is a device for supplying drive voltage to the air pump 42.

The first cooling system 50 has a water pump 57, filter 58, mixing valve 52, first heat exchanger 54, etc. The water pump 57 is a coolant pump for circulating cooling water within the first coolant system 50. The filter 58 is a particle filter for removing debris, etc. in the cooling water. The mixing valve 52 is a valve for controlling circulation of cooling water within the first cooling system 50. The first heat exchanger 54 exchanges heat between air in the cathode system pipe 40*p* and the cooling water in the first cooling system pipe 50*p*.

The cooling water supplied from the first radiator 350 to the first cooling system inflow port 50*a* passes through the mixing valve 52, water pump 57, filter 58, peripheral device 25, stack 22, etc., and passes through the first heat exchanger 54, etc. Meanwhile, the peripheral device 25, stack 22, etc. are cooled, and air of the cathode system is cooled by the first heat exchanger 54. Due to this, the peripheral device 25, stack 22, cathode system 40, etc. correspond to the first cooling target. Subsequently, this cooling water is discharged to outside of the fuel cell system 100 from the first cooling system outflow port 50*b*, and returns to the first radiator 350. From the above, the first cooling system 50 circulates cooling water between the first cooling target and first radiator 350. The first radiator 350 exchanges heat between the cooling water and ambient air.

The second cooling system 60 also has a water pump, filter, mixing valve, etc. (not illustrated), similarly to the case of the first cooling system 50. Furthermore, the second cooling system 60 has two second heat exchangers 64A, 64B. Each second heat exchanger 64A, 64B exchanges heat between the air in the cathode system pipe 40*p* and the cooling water in the second cooling system pipe 60*p*. The respective second heat exchangers 64A, 64B are separate members from the other second heat exchangers 64A, 64B, independent from the other second heat exchangers 64B, 64A.

The cooling water supplied from the second radiator 360 to the second cooling system inflow port 60*a* passes through the stack 22, sensor board 26, pump drive device 41, air pump 42, etc., and also passes through the two second heat exchangers 64A, 64B. Meanwhile, the stack 22, sensor board 26, pump drive device 41, air pump 42, etc. are cooled, and the air of the cathode system is cooled by the second heat exchangers 64A, 64B. Due to this, in addition to the stack 22 and sensor board 26 corresponding to the second cooling target, the pump drive device 41, air pump 42, air, etc. in the cathode system 40 correspond to the second cooling target.

Subsequently, this cooling water is discharged from the second cooling system outflow port 60*b* to outside of the fuel cell system 100, and returns to the second radiator 360. From the above, the second cooling system 60 circulates cooling water between the second cooling target and the second radiator 360. The second radiator 360 exchanges heat between the cooling water and ambient air.

Next, the cathode system 40 will be explained. The air passing through the air cleaner 340 from outside the vehicle and supplied to the cathode system intake port 40*a* passes, in order, through the air pump 42, air branching part 43, each second heat exchanger 64A, 64B, air merging part 45, first heat exchanger 54, and peripheral device 25, and reaches the cathode electrode in the stack 22. Subsequently, this air is discharged, together with water produced in the cathode electrode, from the cathode system outflow port 40*b* to outside of the fuel cell system 100 and is discharged to outside the vehicle.

As above, the air splits at the air branching part 43, and then passes through each second heat exchanger 64A, 64B, and merges in the air merging part 45. In other words, in the cathode system 40, the two second heat exchangers 64A, 64B are arranged in parallel, and the cathode system 40 passes the air in parallel through the two second heat exchangers 64A, 64B. The reason thereof will be explained below.

Figure 3:
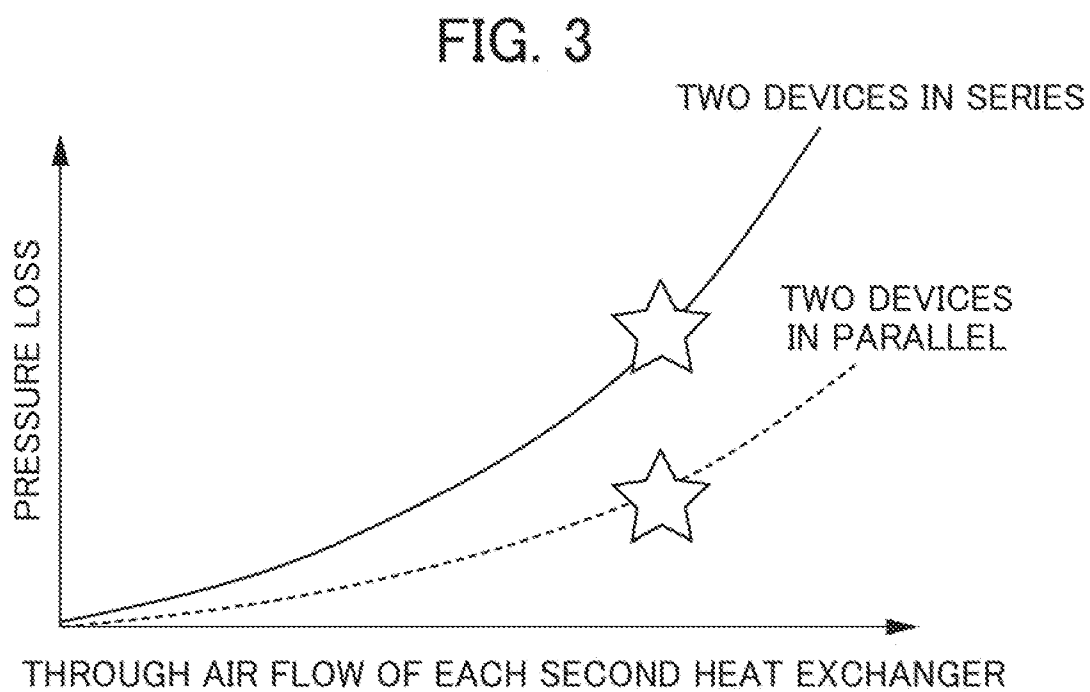
FIG. 3 is a graph showing pressure loss of the cathode system.

FIG. 3 is a graph showing the difference in pressure loss between the case of arranging the two second heat exchangers 64A, 64B in the cathode system 40 in series, and the case of arranging in parallel. The horizontal axis shows the air flowrate passing through each one of the second heat exchangers, and the vertical axis shows the pressure loss over the entire portion of the cathode system 40 including the two second heat exchangers 64A, 64B. In both the case of series and parallel, the pressure loss of this portion overall increases accompanying the air flowrate increasing. However, while the air flowrates passing through each one of the second heat exchangers 64A, 64B are the same, the pressure loss of this portion overall in the case of series is twice the pressure loss of the overall portion in the case of parallel, due to the addition of pressure loss of each second heat exchanger 64A, 64B.

Figure 4:
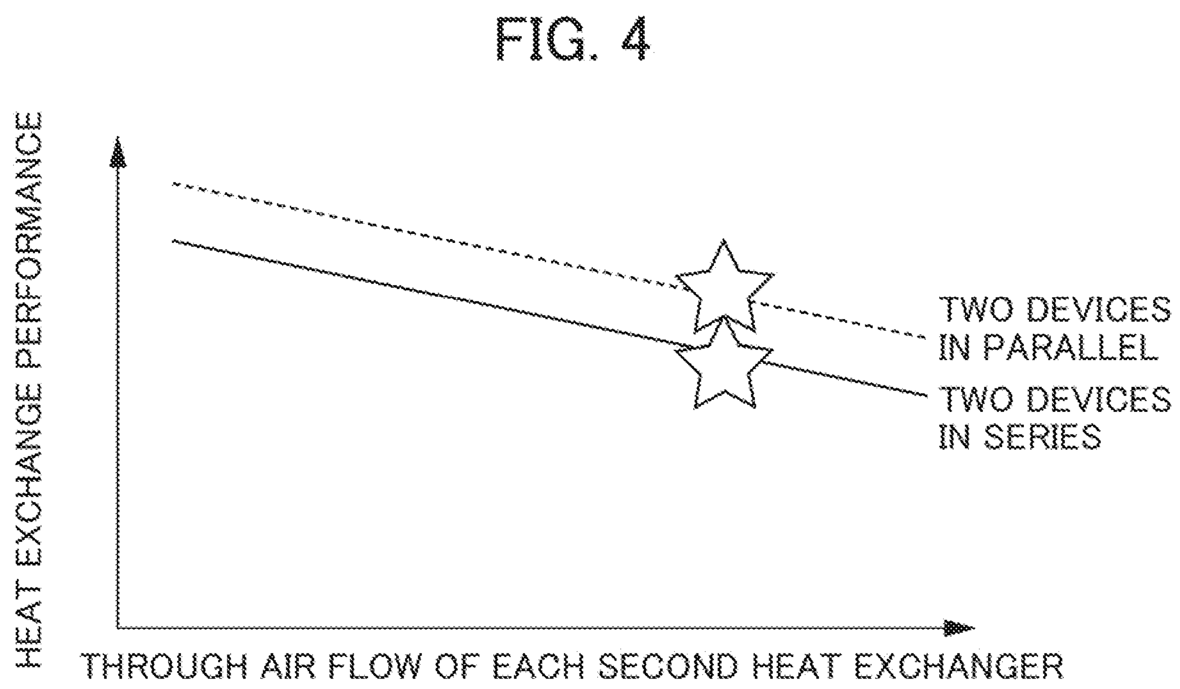
FIG. 4 is a graph showing the heat exchanging performance of the cathode system.

FIG. 4 is a graph showing the difference in heat exchange performance between a case of arranging the two second heat exchangers 64A, 64B in the second cooling system 60 in series, and the case of arranging in parallel. The horizontal axis shows the air flowrate passing through each one of the second heat exchangers, similarly to the case of FIG. 3. The vertical axis shows the heat exchange performance of the overall portion including these two second heat exchangers 64A, 64B in the cathode system. In both the case of series and parallel, the heat exchange performance of the overall portion declines as the air flowrate increases. However, in the case of series, the downstream side second heat exchanger further cools the air cooled by the upstream side second heat exchanger; therefore, the heat exchange performance of the overall portion declines relative to the case of parallel.

From the above it is found that, while the air flowrates passing through each one of the second heat exchangers 64A, 64B are the same, arranging the two second heat exchangers 64A, 64B in parallel is more superior than arranging in series in both aspects of pressure loss suppression and heat exchange performance. Due to this, in the present embodiment, as previously mentioned, the two second heat exchangers 64A, 64B are arranged in parallel in the cathode system 40.

Figure 5:
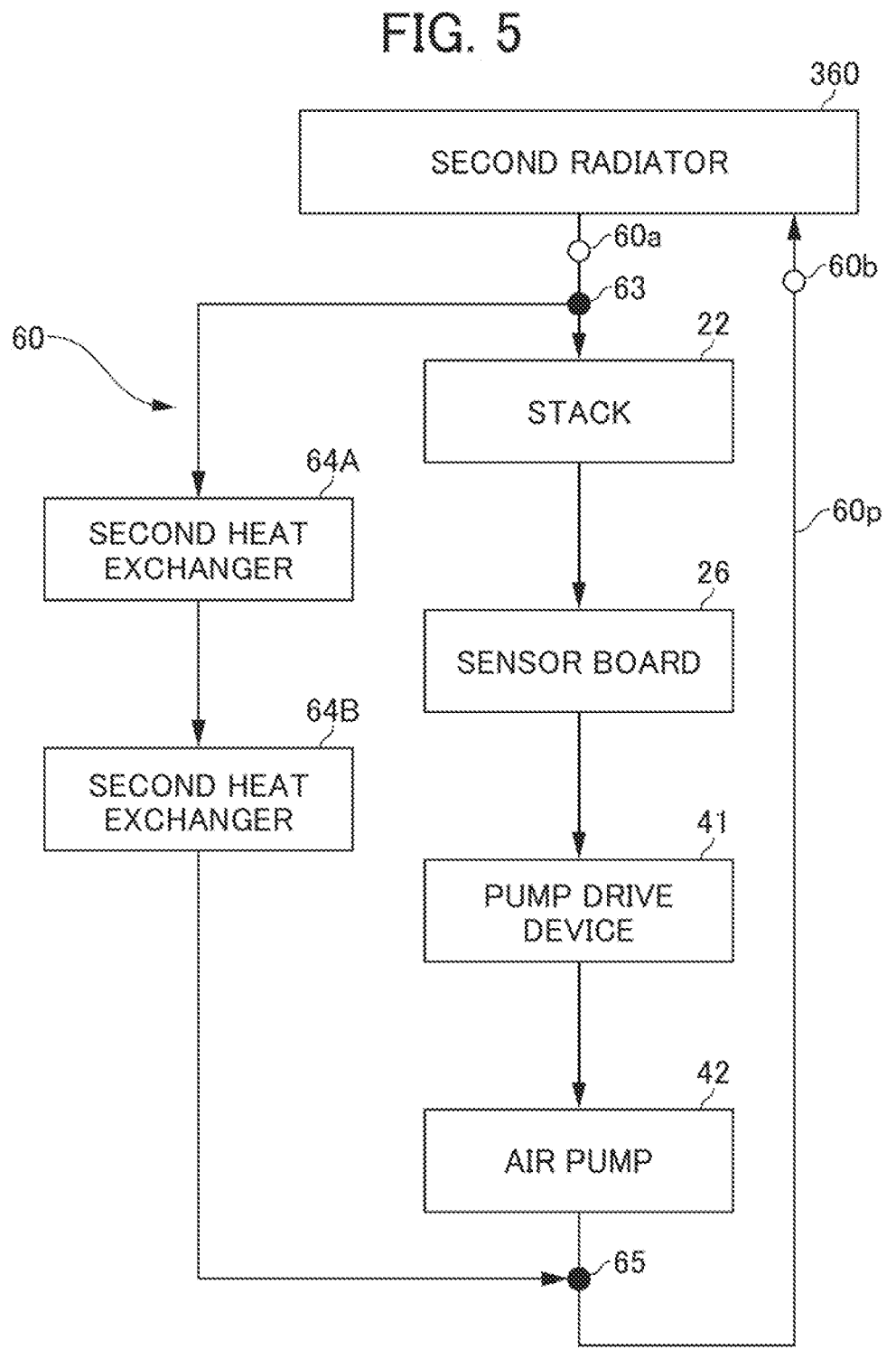

FIG. 5 is a block diagram showing the second cooling system 60. The cooling water flowing from the second radiator 360 into the second cooling system inflow port 60*a* branches at the cooling water branching part 63. The branched cooling water, in order, passes through the stack 22, sensor board 26, pump drive device 41 and air pump 42 to cool these, and then reaches the cooling water merging part 65. The other cooling water branched at the cooling water branching part 63 passes in order through the two second heat exchangers 64A, 64B, meanwhile cooling the air of the cathode system 40, and then reaches the cooling water merging part 65. In other words, in the second cooling system 60, the two second heat exchangers 64A, 64B are arranged in series, and the second cooling system 60 passes cooling water in series through the two second heat exchangers 64A, 64B. The cooling water merging in the cooling water merging part 65 is discharged from the second cooling system outflow port 60*b* to outside of the fuel cell system 100 and returns to the second radiator 360.

Figure 6:
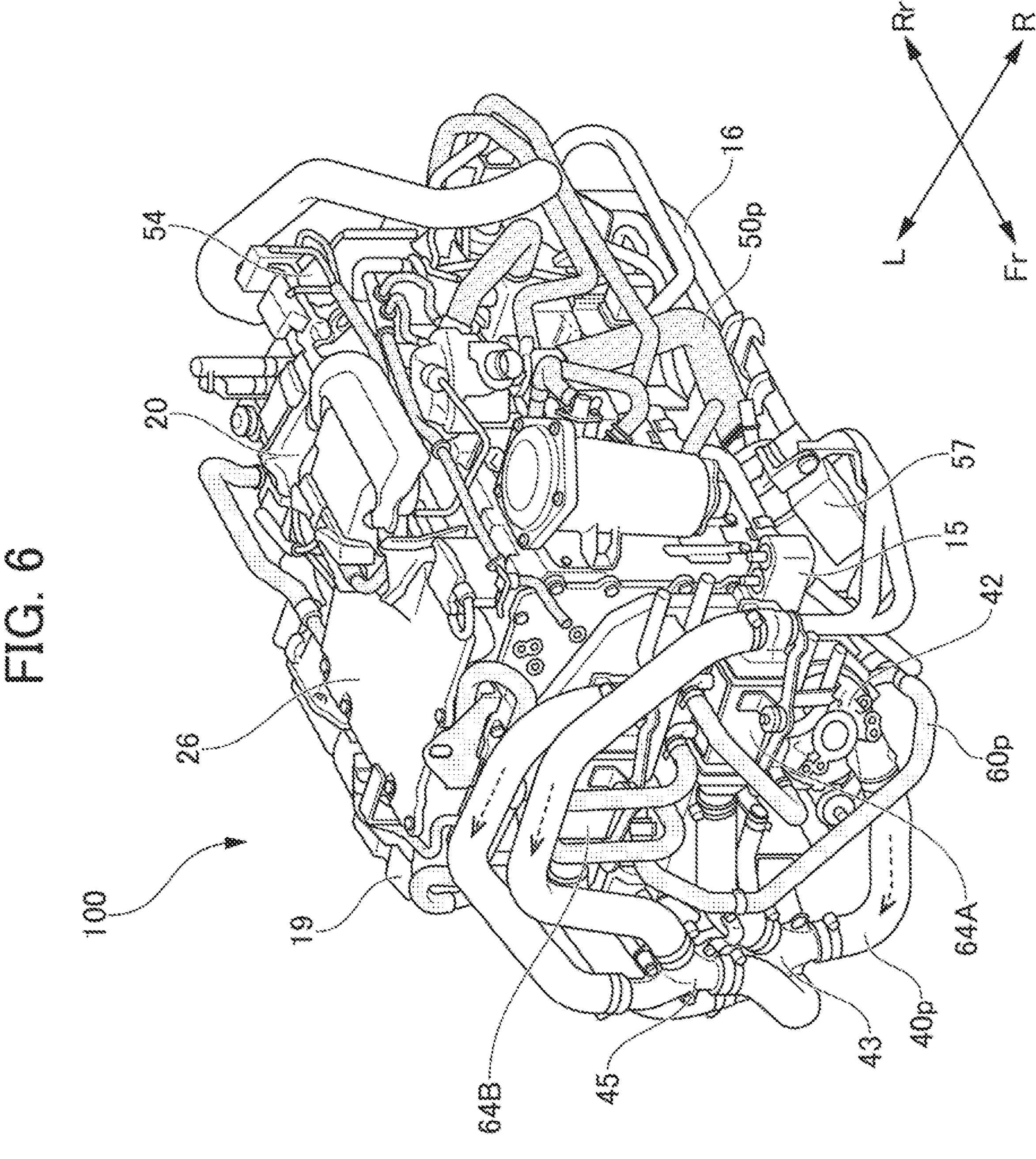
FIG. 6 is a perspective view showing a fuel cell system.

FIG. 6 is a perspective view showing the fuel cell system 100. Hereinafter, one side in the longitudinal direction of the fuel cell system 100 in the top view is referred to as "front Fr", the opposite direction thereto is referred to as "rear Rr", the left side in a front view seen from the front Fr side is referred to as "left L", and the right side is referred to as "right R".

As above, "front Fr" is a side in the longitudinal direction of the fuel cell system 100; therefore, "front Fr" is not necessarily the front side in the vehicle length direction of the electric vehicle. More specifically, for example, "front Fr" may be the front side in the vehicle length direction, may be the rear side in the vehicle length direction, may be the vehicle width direction, or may be a direction forming an angle with the vehicle length direction and the vehicle width direction.

The first heat exchanger 54 connected to the first radiator 350 is arranged more to the rear Rr side than the stack assembly 20. The first heat exchanger 54 is thereby arranged more to the rear Rr side than the stack 22. On the other hand, the two second heat exchangers 64A, 64B connected with the second radiator 360 are arranged more to the front Fr side than the stack assembly 20. The two second heat exchangers 64A, 64B are thereby collectively arranged more to the front Fr side than the stack 22. For this reason, for each of the second heat exchangers 64A, 64B, the heat exchanger other than itself closest to itself, among all of the heat exchangers 54, 64A, 64B including the first heat exchanger 54 and two second heat exchangers 64A, 64B, is the second heat exchanger 64B, 64A other than itself.

The distance from the air branching part 43 to one second heat exchanger 64A along the cathode system pipe 40*p*, and the distance from the air branching part 43 to the other second heat exchanger 64B along the cathode system pipe 40*p* are equal to each other. In addition, the distance from one second heat exchanger 64A to the air merging part 45 along the cathode system pipe 40*p*, and the distance from the other second heat exchanger 64B to the air merging part 45 along the cathode system pipe 40*p* are equal to each other.

For this reason, the distance from the air branching part 43 passing through one second heat exchanger 64A to the air merging part 45 along the cathode system pipe 40*p*, and the distance from the air branching part 43 passing through the other second heat exchanger 64B to the air merging part 45 along the cathode system pipe 40*p* are equal to each other.

Figure 7:
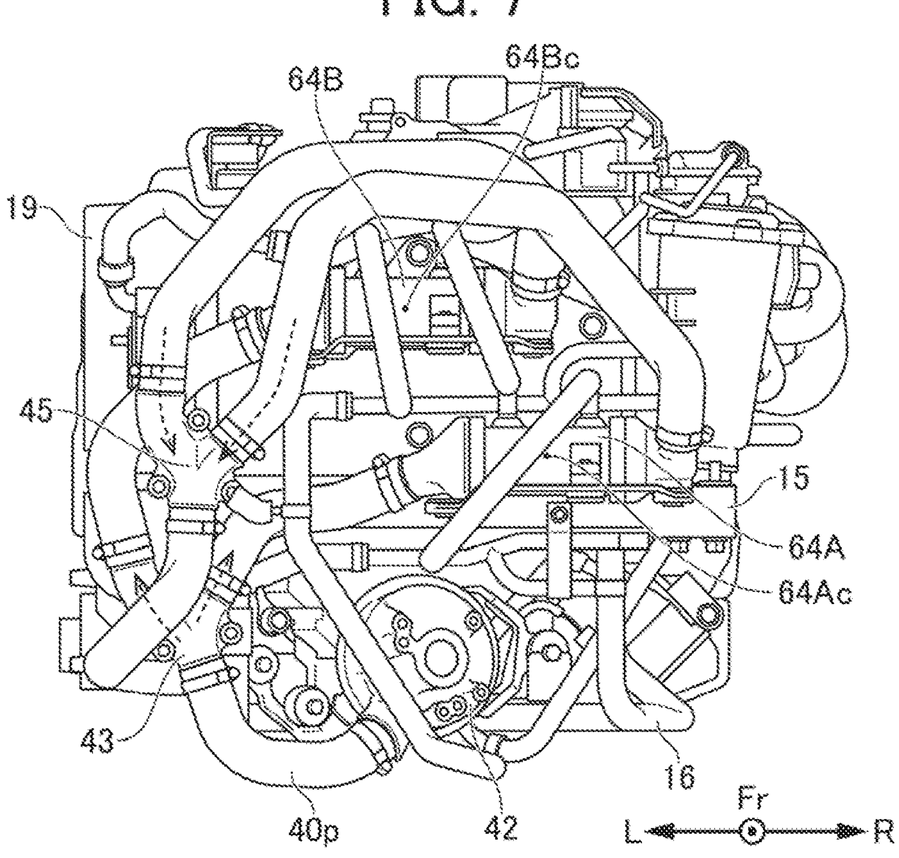
FIG. 7 is a front view showing a fuel cell system.

FIG. 7 is a front view seeing the fuel cell system 100 from the front Fr side. The arrangements of the two second heat exchangers 64A, 64B are shifted from each other in the vertical direction and left/right direction L, R in a front view. In other words, in the front view, the center of gravity 64Ac of one second heat exchanger 64A and the center of gravity 64Bc of the other second heat exchanger 64B are shifted from each other in the vertical direction and left/right direction L, R.

One among the air branching part 43 and air merging part 45 is arranged more downwards than the upper second heat exchanger 64B, and more to either left or right than the two second heat exchangers 64A, 64B. The other one among the air branching part 43 and air merging part 45 is arranged more downwards then the lower heat exchanger 64A, and more to either left or right than the two second heat exchangers 64A, 64B.

More specifically, in FIG. 7, the air merging part 45 is arranged more downwards than the upper second heat exchanger 64B, and more to the left L than the two second heat exchangers 64A, 64B. In addition, the air branching part 43 is arranged more downwards than the lower heat exchanger 64A, and more to the left L than the two second heat exchangers 64A, 64B.

Figure 8:
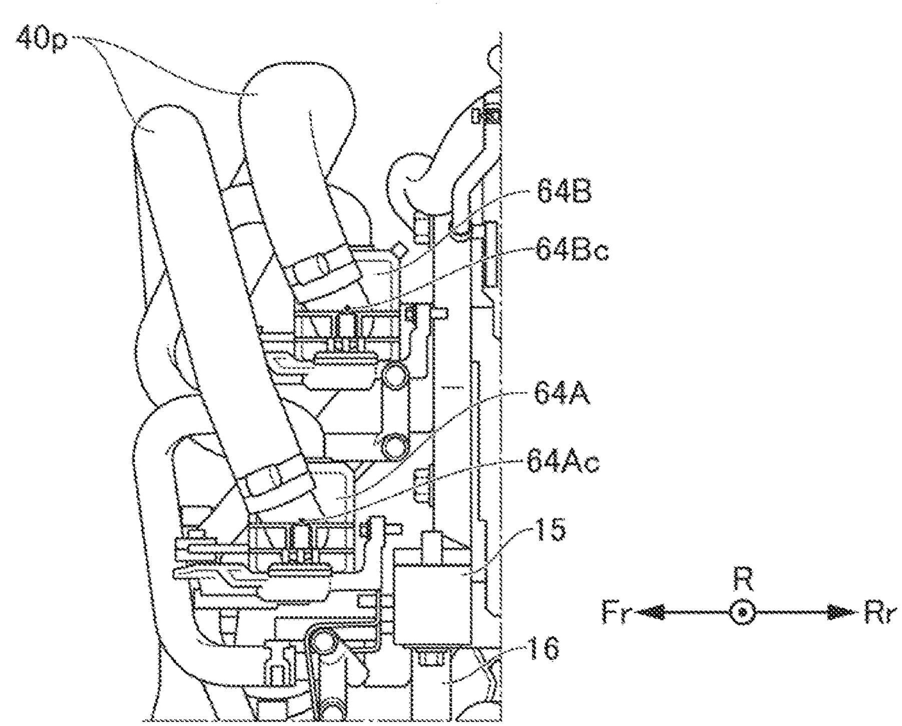
FIG. 8 is a side view showing two second heat exchangers and the periphery thereof.

FIG. 8 is a side view looking at the two second heat exchangers 64A, 64B, and the vicinity thereof from the right R side. The two second heat exchangers 64A, 64B are shifted in the vertical direction and front/rear direction Fr, Rr from each other in a side view. In other words, in a side view, the center of gravity 64Ac of one second heat exchanger 64A and the center of gravity 64Bc of the other second heat exchanger 64B are shifted in the vertical direction and front/rear direction Fr, Rr from each other.

As above, the two second heat exchangers 64A, 64B are shifted from each other in each direction of up/down, front/rear and left/right.

Figure 9:
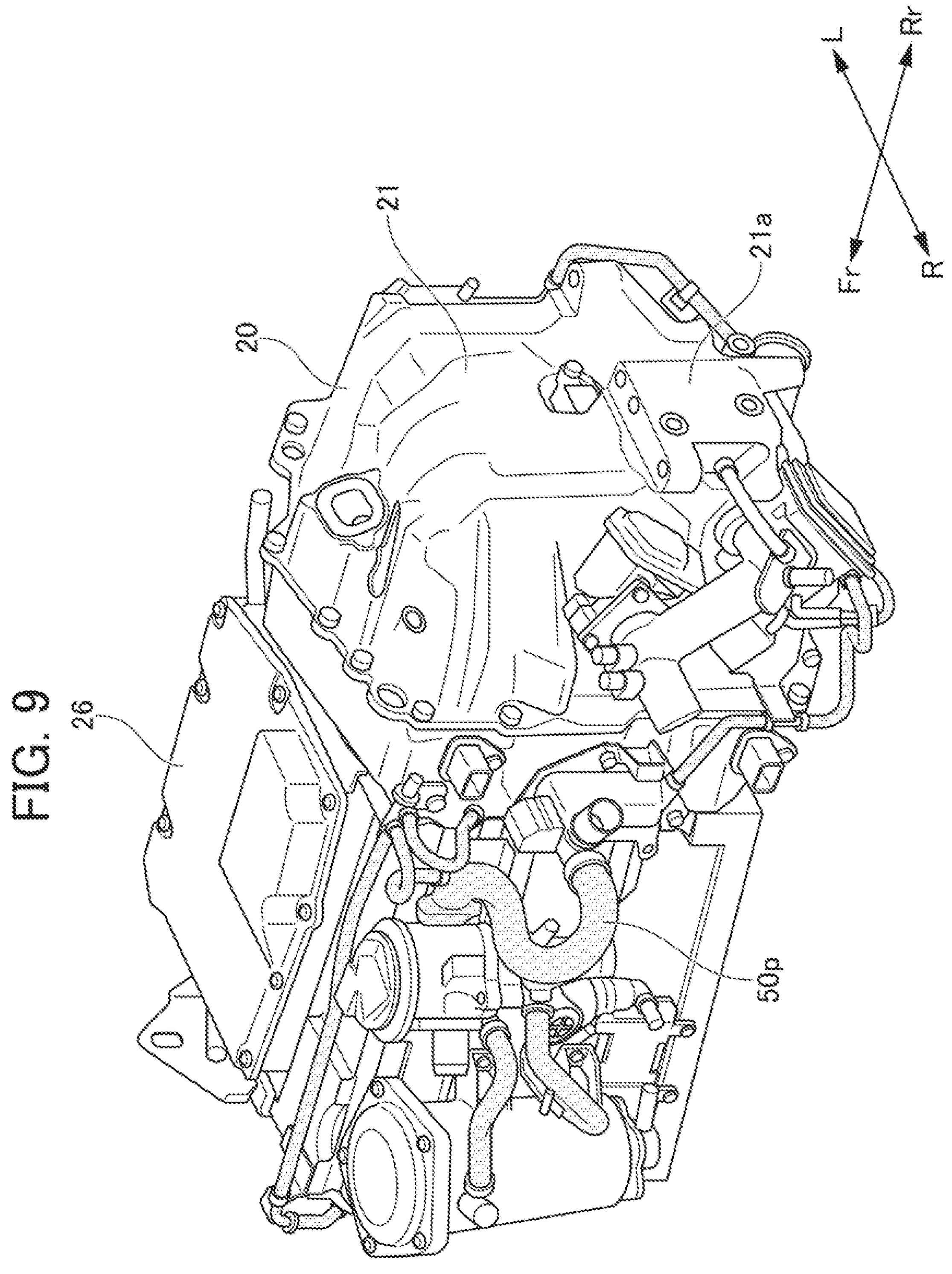
FIG. 9 is a perspective view showing a stack assembly and cooling system pipe.

FIG. 9 is perspective view showing the stack assembly 20 and cooling system pipes 50*p*, 60*p*. The stack assembly 20 has a cover 21 which covers the stack 22 and peripheral device 25. A protrusion 21*a* is provided at the rear end and front end of the cover 21. The sensor board 26 is attached to the upper face of the cover 21.

Figure 10:
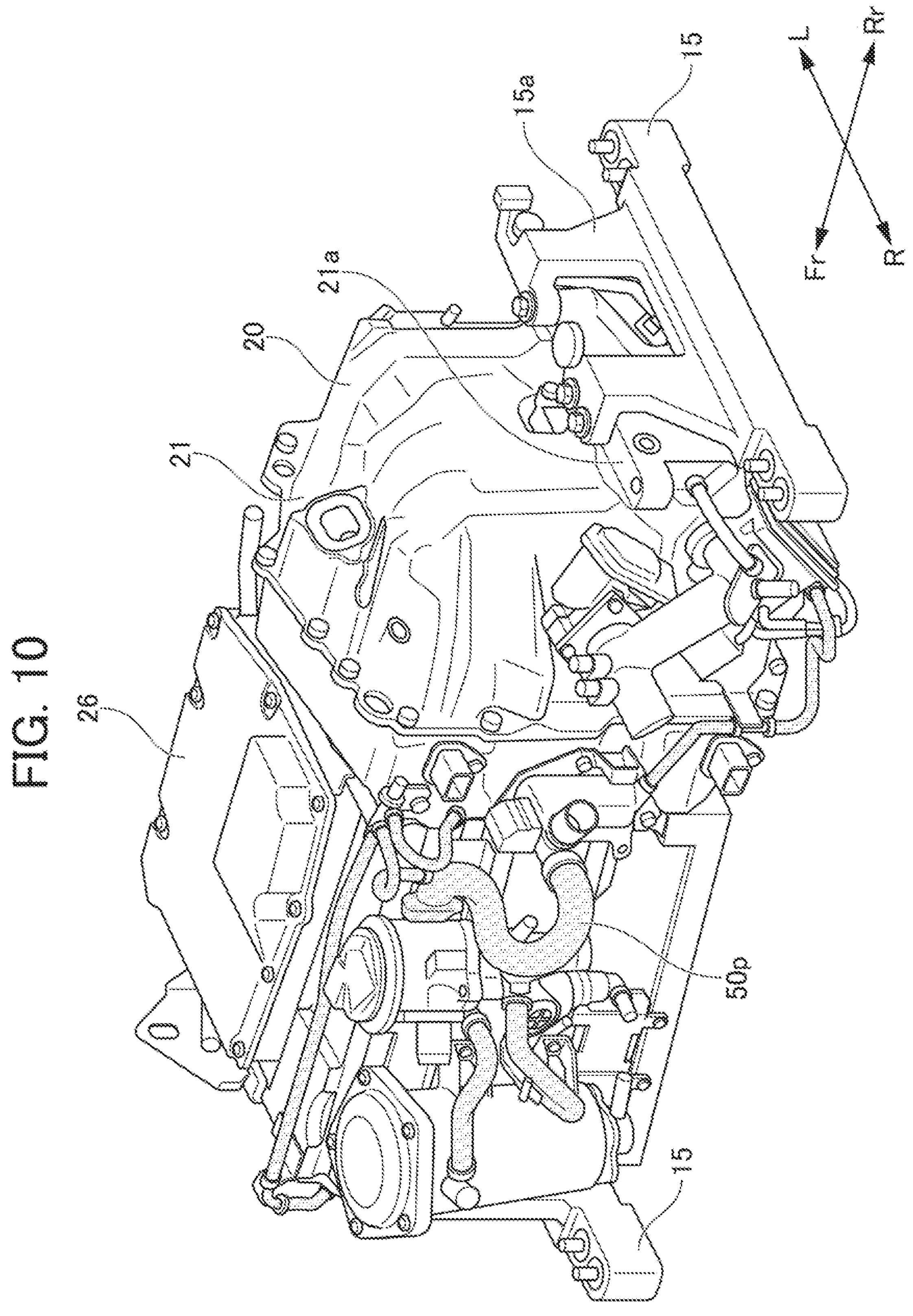
FIG. 10 is a perspective view showing a state attaching a connection part, etc. to the stack assembly.

FIG. 10 is a perspective view showing a state attaching the bracket 15 as a connector for connecting the frame 16 described later to the protrusions 21*a* at both front/rear sides of the cover 21 of the stack assembly 20 in the state shown in FIG. 9. The bracket 15 is a member extending in the left/right directions L, R, and has a mounting part 15*a* extending upwards at the upper part. This mounting part 15*a* is attached to the protrusion 21*a* of the cover 21.

Figure 11:
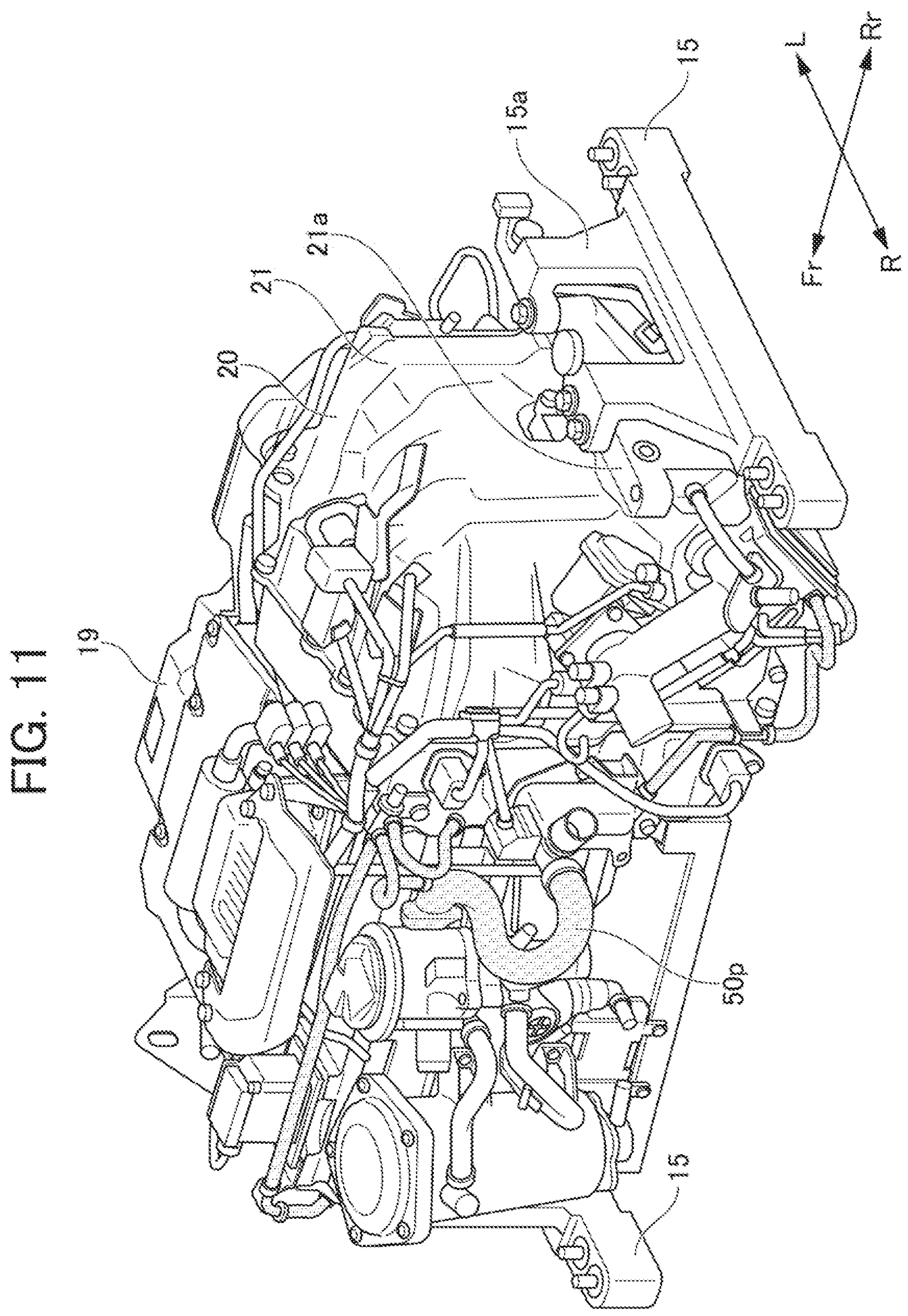
FIG. 11 is a perspective view showing a state attaching a voltage transformer from the state in FIG. 10.

FIG. 11 is a perspective view showing a state attaching a voltage transformer 19, etc. to the stack assembly 20 in the state shown in FIG. 10. The voltage transformer 19 transforms the electricity supplied to the fuel cell system 100 from outside of the fuel cell system 100.

Figure 12:
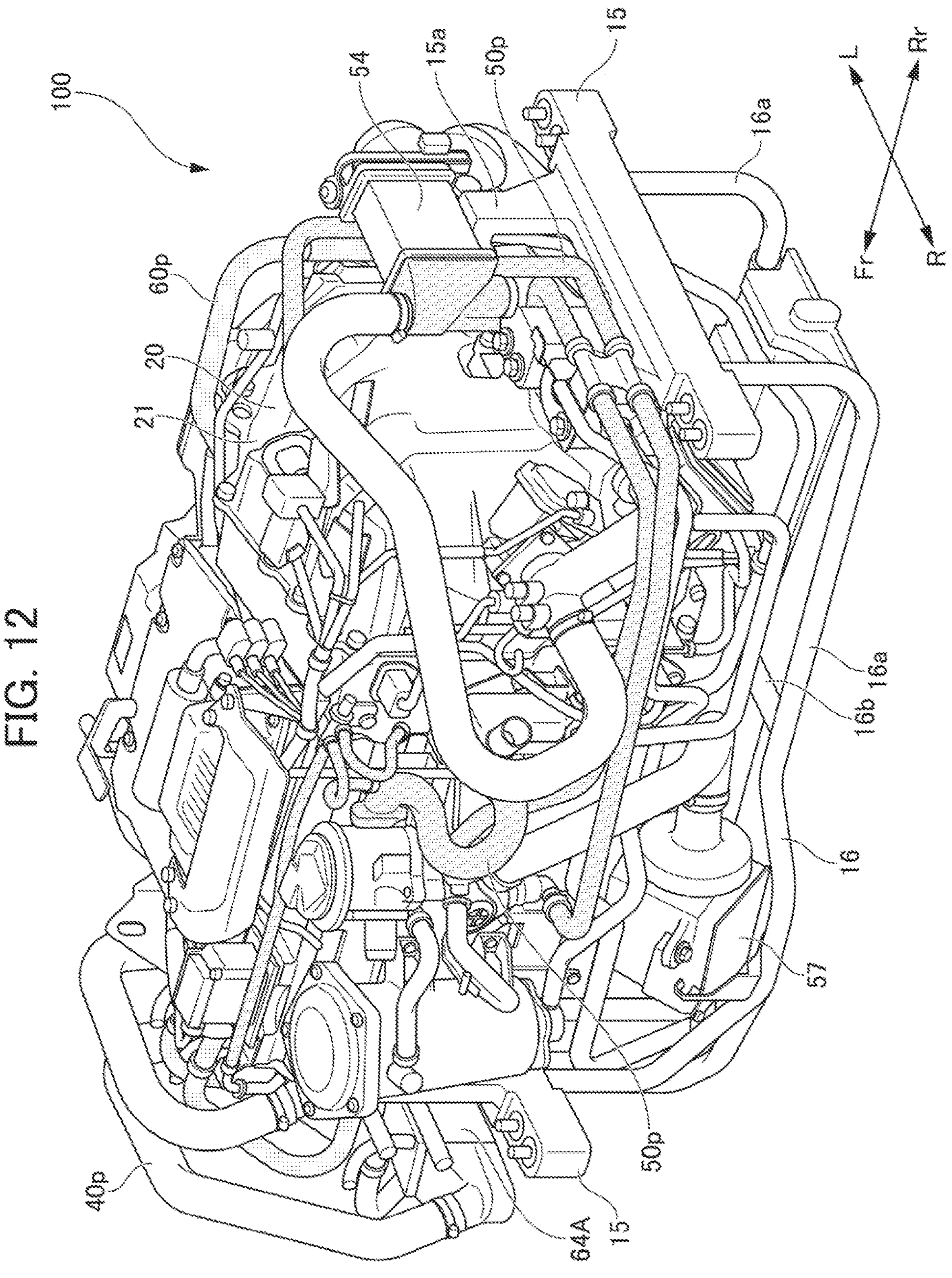
FIG. 12 is a perspective view showing a state attaching a cathode system pipe from the state in FIG. 11.

FIG. 12 is a perspective view showing a state attaching the cathode system pipe 40*p* to the periphery of the stack assembly 20 and cooling system pipes 50*p*, 60*p* in the state shown in FIG. 11, and attaching the frame 16 to the bracket 15. This state shown in FIG. 12 indicates the completed state of the fuel cell system 100 of the present embodiment.

The frame 16 has two frame first parts 16*a* extending in the front/rear direction Fr, Rr at an interval in the left/right direction L, R below the stack assembly 20, and a frame second part 16*b* linking the frame first parts 16*a*. The front end and rear end of each frame first part 16*a* respectively curve to extend upwards, and each upper end of this front end and rear end is connected to the bracket 15. From the above, both front/rear ends of the frame 16 are connected to the stack assembly 20 via the bracket 15.

Figure 13:
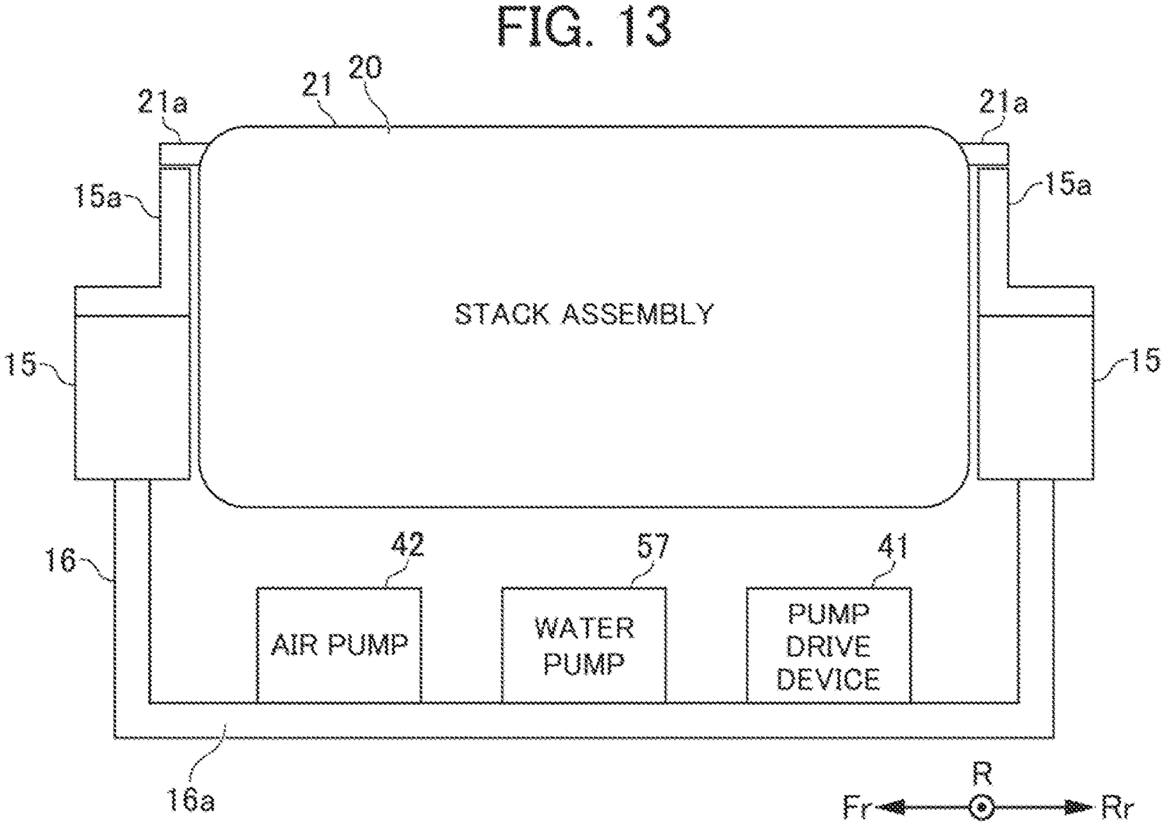
FIG. 13 is a schematic drawing viewing a fuel cell system from a lateral side.

FIG. 13 is a schematic drawing viewing the fuel cell system 100 from the right R. Hereinafter, the air pump 42, pump drive device 41 and water pump 57 are collectively referred to as "electrical devices 41, 42, 57".

In the side view seen from the right R, the stack assembly 20 is surrounded from the three sides of the front Fr side, rear Rr side and lower side, by the front/rear brackets 15 and frame first part 16*a*. In the same side view, at least a predetermined portion of the electrical devices 41, 42, 57 is surrounded from four sides in the front/rear direction Fr, Rr and vertical direction, by the frame first part 16*a* and stack assembly 20.

Figure 14:
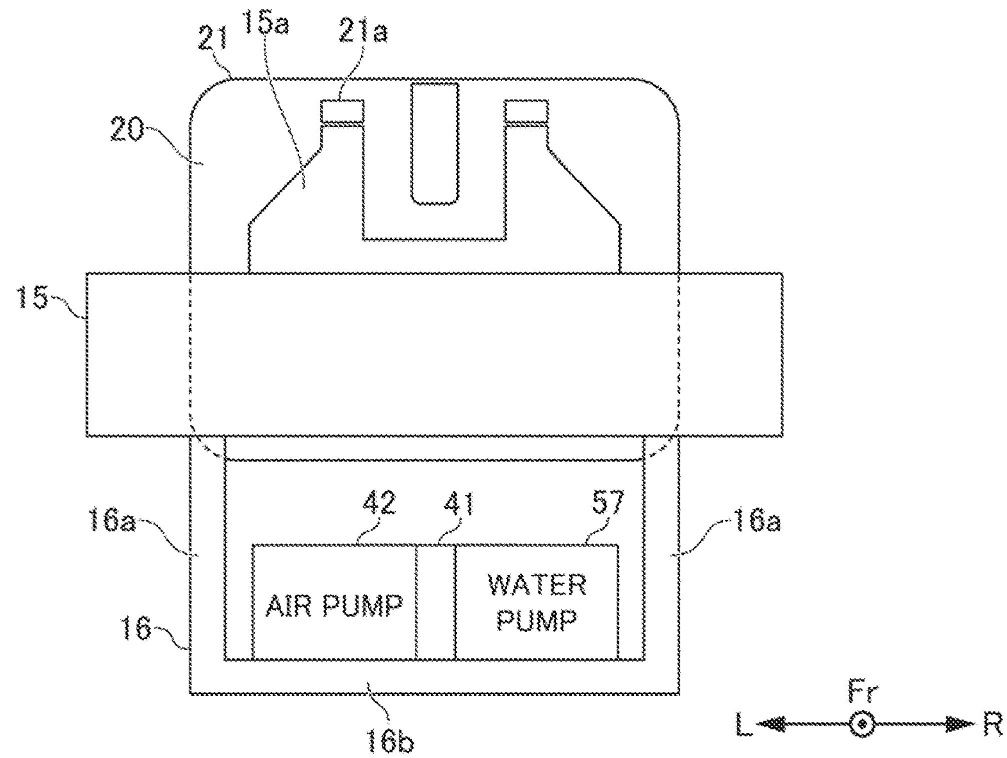
FIG. 14 is a schematic drawing viewing the fuel cell system from the front side.

FIG. 14 is a block diagram viewing the fuel cell system 100 from the front Fr. In the front view seen from the front Fr, at least a predetermined portion of the electrical devices 41, 42, 57 is surrounded from the four sides of the left/right direction L, R and vertical direction, by the left and right frame first parts 16*a*, the stack assembly 20 and frame second part 16*b*.

Figure 22:
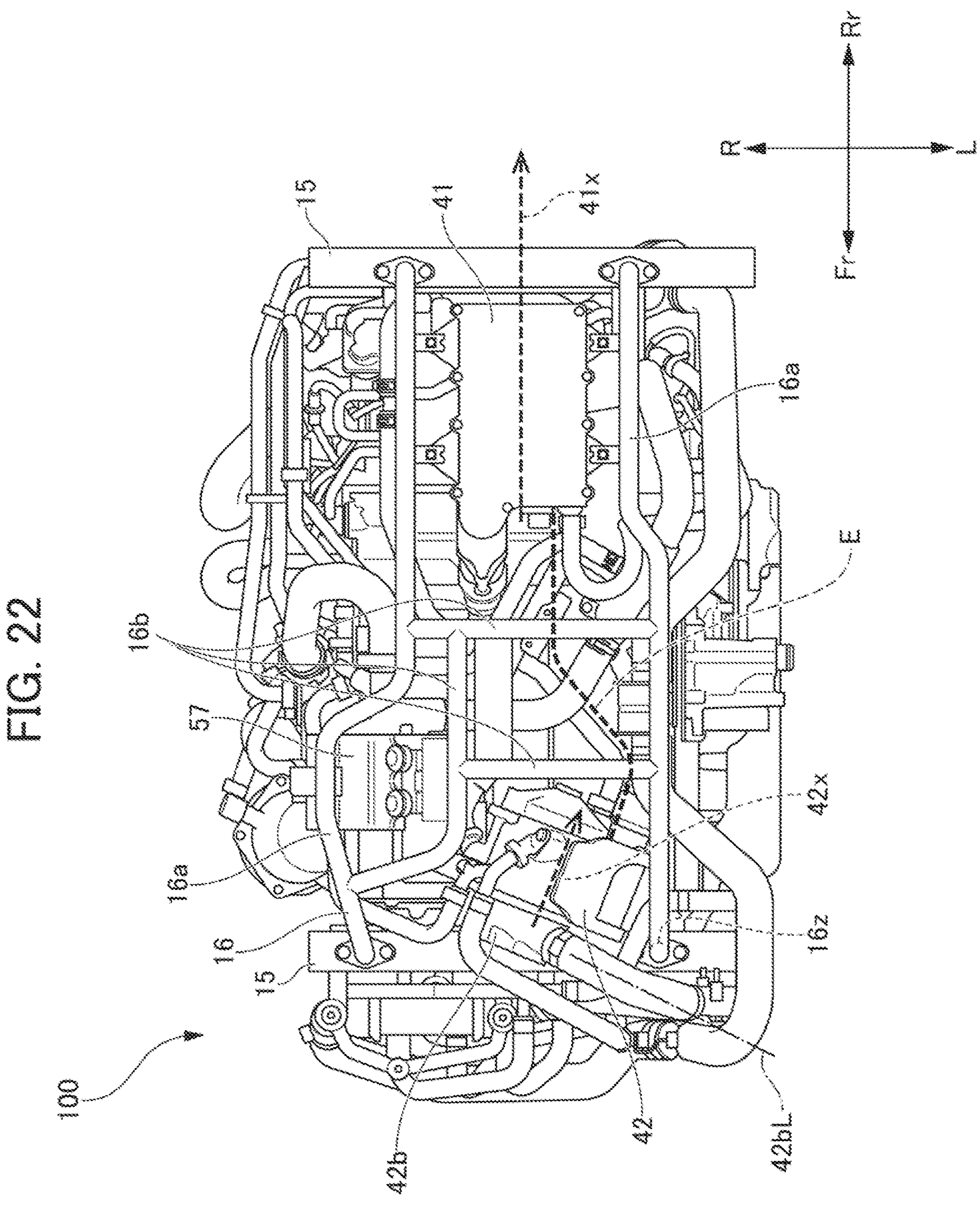
FIG. 22 is a bottom view showing the fuel cell system.

FIG. 22 referenced later is a bottom view looking at the fuel cell system 100 from below. In the bottom view, at least a predetermined portion of the electrical devices 41, 42, 57 is surrounded from the four sides of the left/right direction L, R and front/rear direction Fr, Rr, by the left/right frame first parts 16*a* and front/rear brackets 15.

Figure 15:
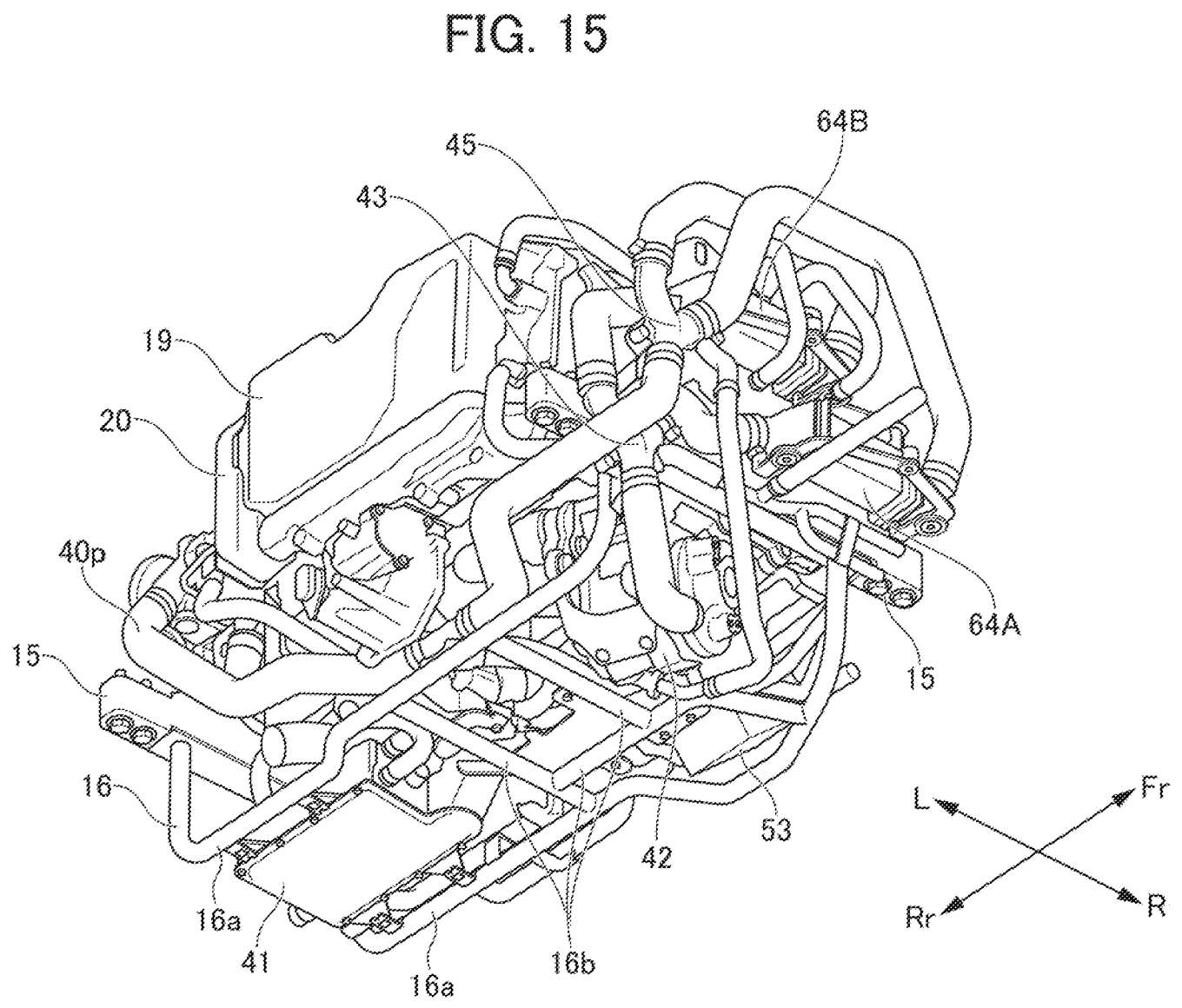

FIG. 15 is a perspective view looking at the fuel cell system 100 from the left front obliquely below. As above, the at least predetermined portion of the electrical devices 41, 42, 57 is surrounded from four sides in the side view and front view by the frame 16 and stack assembly 20, and surrounded from four sides in the bottom view by the frame 16 and bracket 15.

Figure 16:
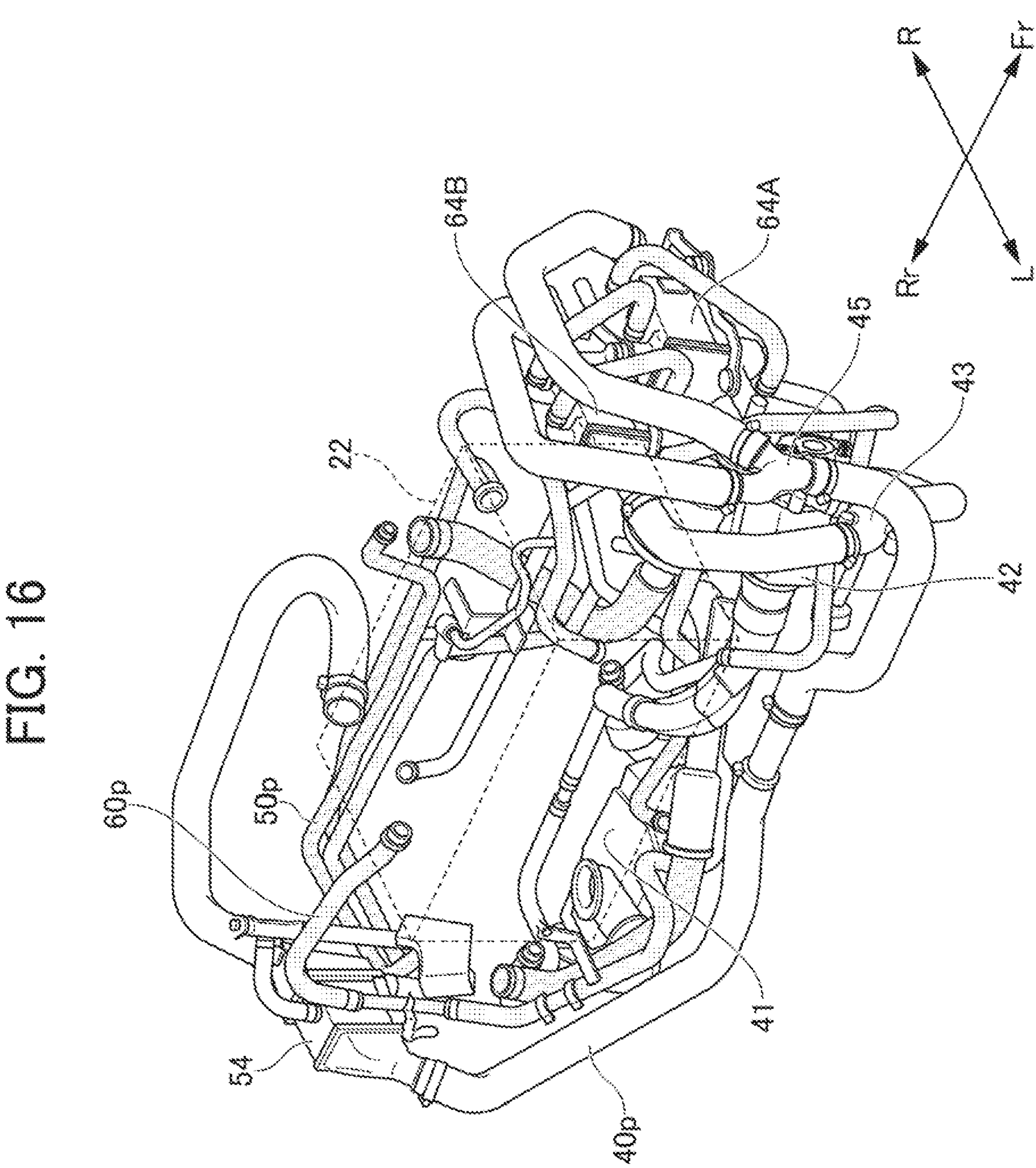
FIG. 16 is a perspective view showing a cathode system pipe and a cooling system pipe.

FIG. 16 is a perspective view showing the cathode system pipe 40*p* and cooling system pipes 50*p*, 60*p*. The cooling system pipes 50*p*, 60*p* are arranged on the outer side of the stack assembly 20 including the stack 22. The cathode system pipe 40*p* is arranged further to the outer side of these cooling system pipes 50*p*, 60*p*. The cooling system pipes 50*p*, 60*p* carry cooling water, while the cathode system pipe 40*p* carries air, and thus the average pipe diameter of the cathode system pipe 40*p* is larger than the average pipe diameter of the cooling system pipes 50*p*, 60*p*. In addition, the cooling system pipes 50*p*, 60*p* carry cooling water, and thus are made of metal, while the cathode system pipe 40*p* carries air, and thus is made of a flexible material including at least one among resin and rubber. Based on the above, the stack 22 is surrounded by the metal cooling system pipes 50*p*, 60*p* of small diameter, and further, a portion surrounding the stack 22 of these cooling system pipes 50*p*, 60*p* is surrounded by the cathode system pipe 40*p* of flexible material with large diameter.

Figure 17:
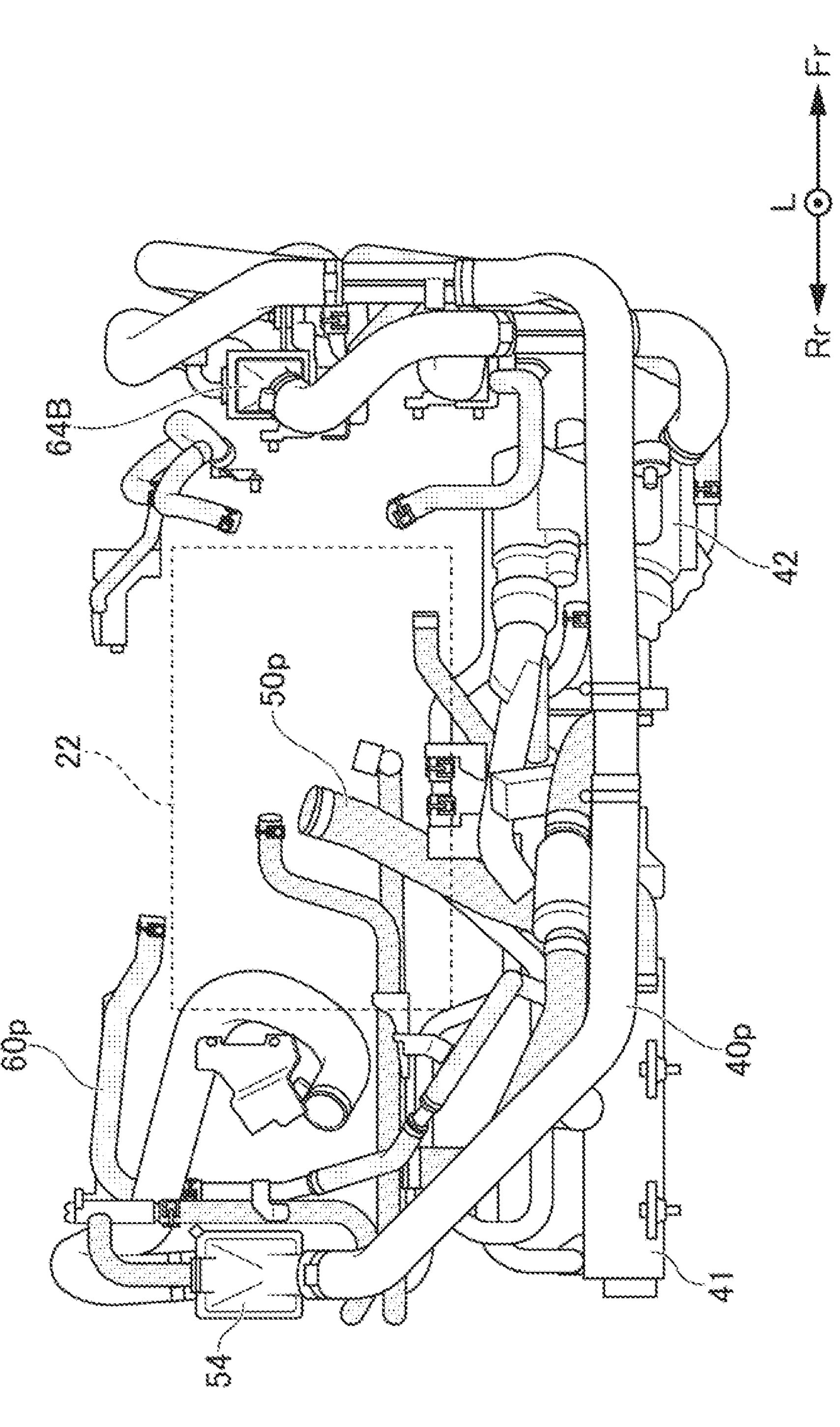
FIG. 17 is a side view showing a cathode system pipe and a cooling system pipe.

FIG. 17 is a side view looking at FIG. 16 from the left L. In a side view, the stack 22, for example, is surrounded from at least the three sides of the rear Rr, below and front Fr, by the cooling system pipes 50*p*, 60*p*. Furthermore, in the same side view, a portion surrounding the stack 22 of the cooling system pipes 50*p*, 60*p*, for example, is surrounded from at least the three sides of the rear Rr, below and front Fr by the cathode system pipe 40*p*.

Figure 18:
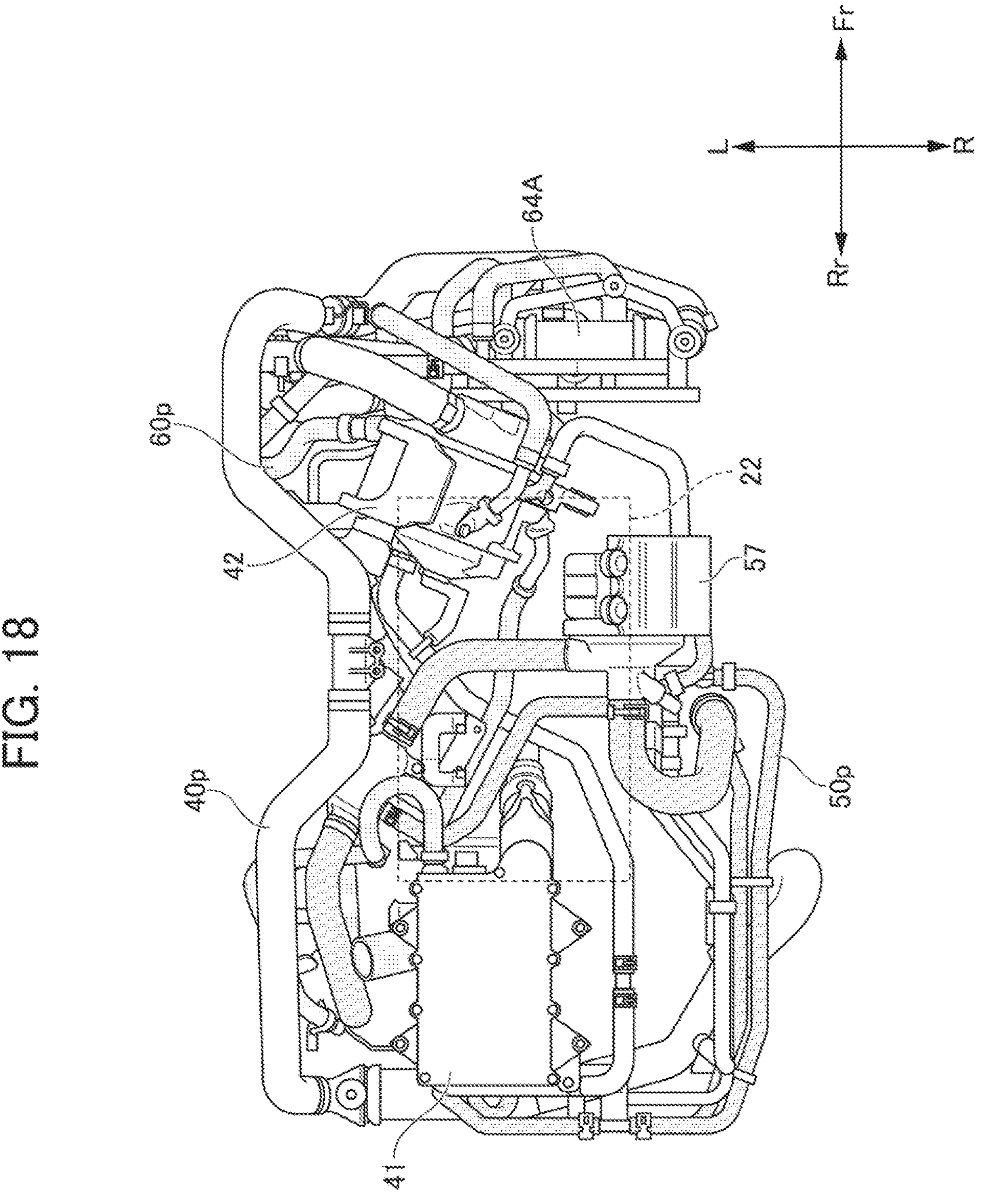
FIG. 18 is a bottom view showing the cathode system pipe and cooling system pipe.

FIG. 18 is a bottom view seeing FIG. 17 from below. In the bottom view, the stack 22, for example, is surrounded from at least the three sides of the rear Rr, left L and front Fr by the cooling system pipes 50*p*, 60*p*. Furthermore, in the same bottom view, the portion surrounding the stack 22 of the cooling system pipes 50*p*, 60*p*, for example, is surrounded from at least the three sides of the rear Rr, left L and front Fr by the cathode system pipe 40*p*.

Figure 19:
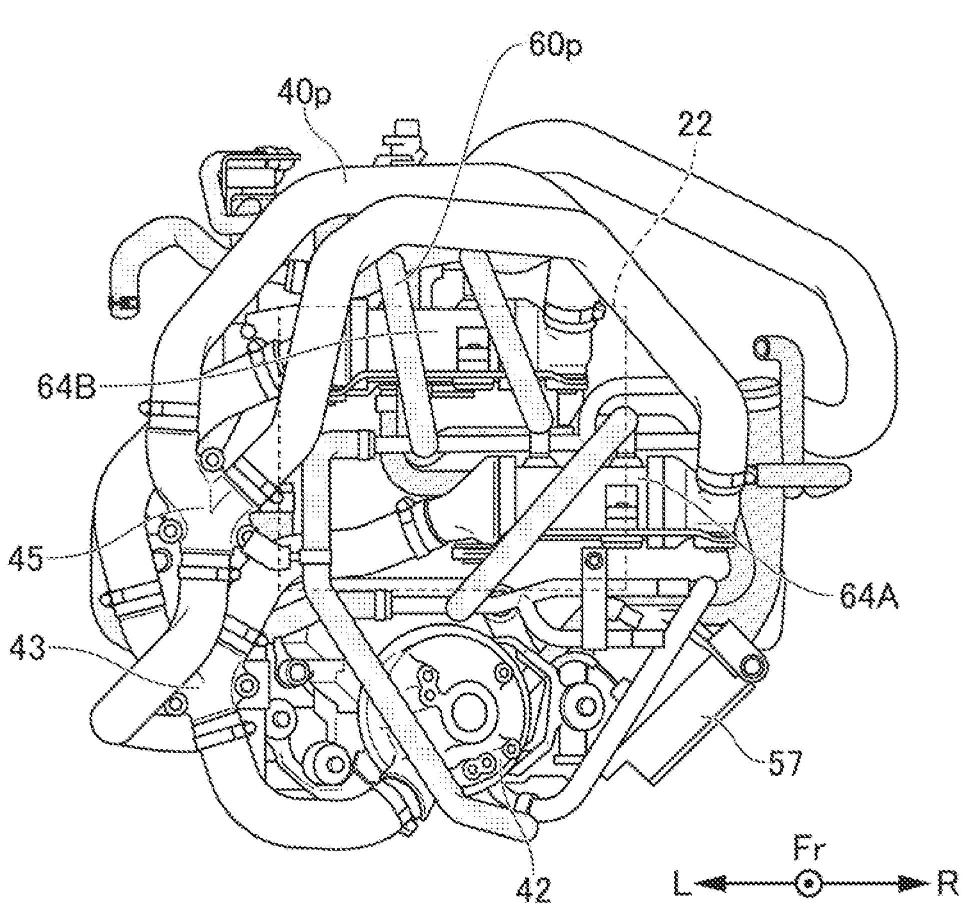
FIG. 19 is a front view showing the cathode system pipe and cooling system pipe.

FIG. 19 is a front view seeing FIG. 18 from the front Fr. In the front view, the stack 22, for example, is surrounded from at least the three sides of the left L, below and right R by the cooling system pipes 50*p*, 60*p*. Furthermore, in the same front view, a portion surrounding the stack 22 of the cooling system pipes 50*p*, 60*p*, for example, is surrounded from at least the three sides of the left L, below and right R by the cathode system pipe 40*p*.

Based on the above, in any of the top view, front view and side view, the stack 22 is surrounded from at least three sides by the cooling system pipes 50*p*, 60*p*, and a portion surrounding the cooling system pipes 50*p*, 60*p* of the cooling system pipes 50*p*, 60*p* is surrounded from at least three sides by the cathode system pipe 40*p*.

Figure 20:
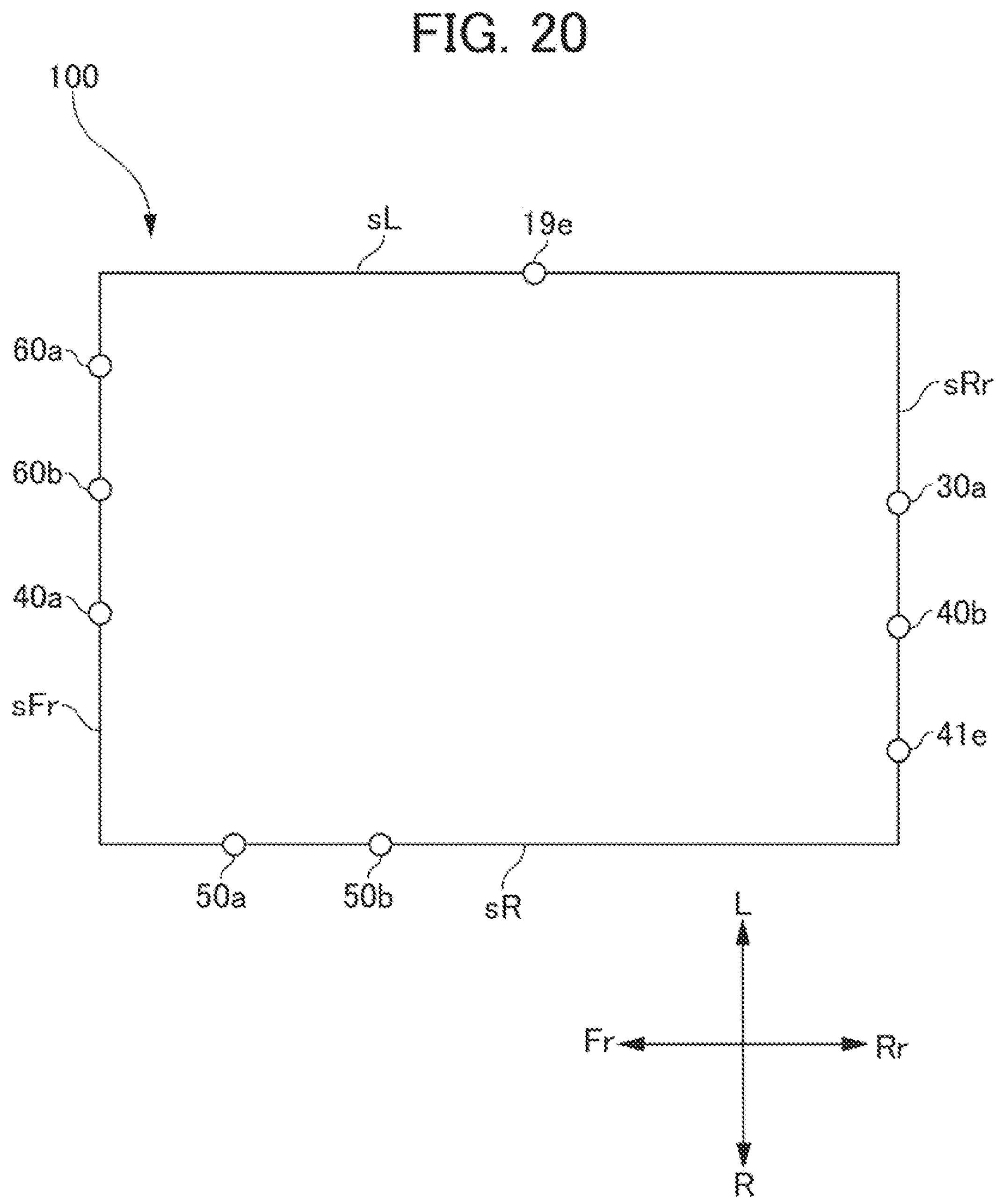
FIG. 20 is a plan view showing respective port arrangements of the fuel cell system.

FIG. 20 is a plan view showing each port arrangement of the fuel cell system 100. In the present embodiment, each port of the anode system intake port 30*a*, cathode system intake port 40*a*, cathode system exhaust port 40*b*, first cooling system inflow port 50*a*, first cooling system outflow port 50*b*, second cooling system inflow port 60*a*, and second cooling system outflow port 60*b* is provided to a system side face as an end in the horizontal direction side of the fuel cell system 100. Then, each of these ports is distributed to at least three faces among the four faces of the front surface sFr, rear surface sRr, left surface sL and right surface sR of the fuel cell system 100, which are system side faces.

Furthermore, power receiving ports 41*e*, 19*e* of the pump drive device 41 and voltage transformer 19, the power receiving ports 41*e*, 19*e* being for receiving electricity from outside of the fuel cell system 100, are also provided to the system side face. In other words, each of the above ports 30*a*, 40*a*, 40*b*, 50*a*, 50*b*, 60*a*, 60*b*, 19*e*, 41*e* is centralized at the system side face, without being provided on the upper face and lower face of the fuel cell system 100.

More specifically, the second cooling system inflow port 60*a*, second cooling system outflow port 60*b*, and cathode system intake port 40*a* are provided to the front surface sFr of the fuel cell system 100. At the right surface sR of the fuel cell system 100, the first cooling system inflow port 50*a* and first cooling system outflow port 50*b* are provided. At the rear surface sRr of the fuel cell system 100, the anode system intake port 30*a* and cathode system exhaust port 40*b*, and power receiving port 41*e* of the pump drive device 41 are provided. At the left surface sL of the fuel cell system, the power receiving port 19*e* of the voltage transformer 19 is provided.

Figure 21:
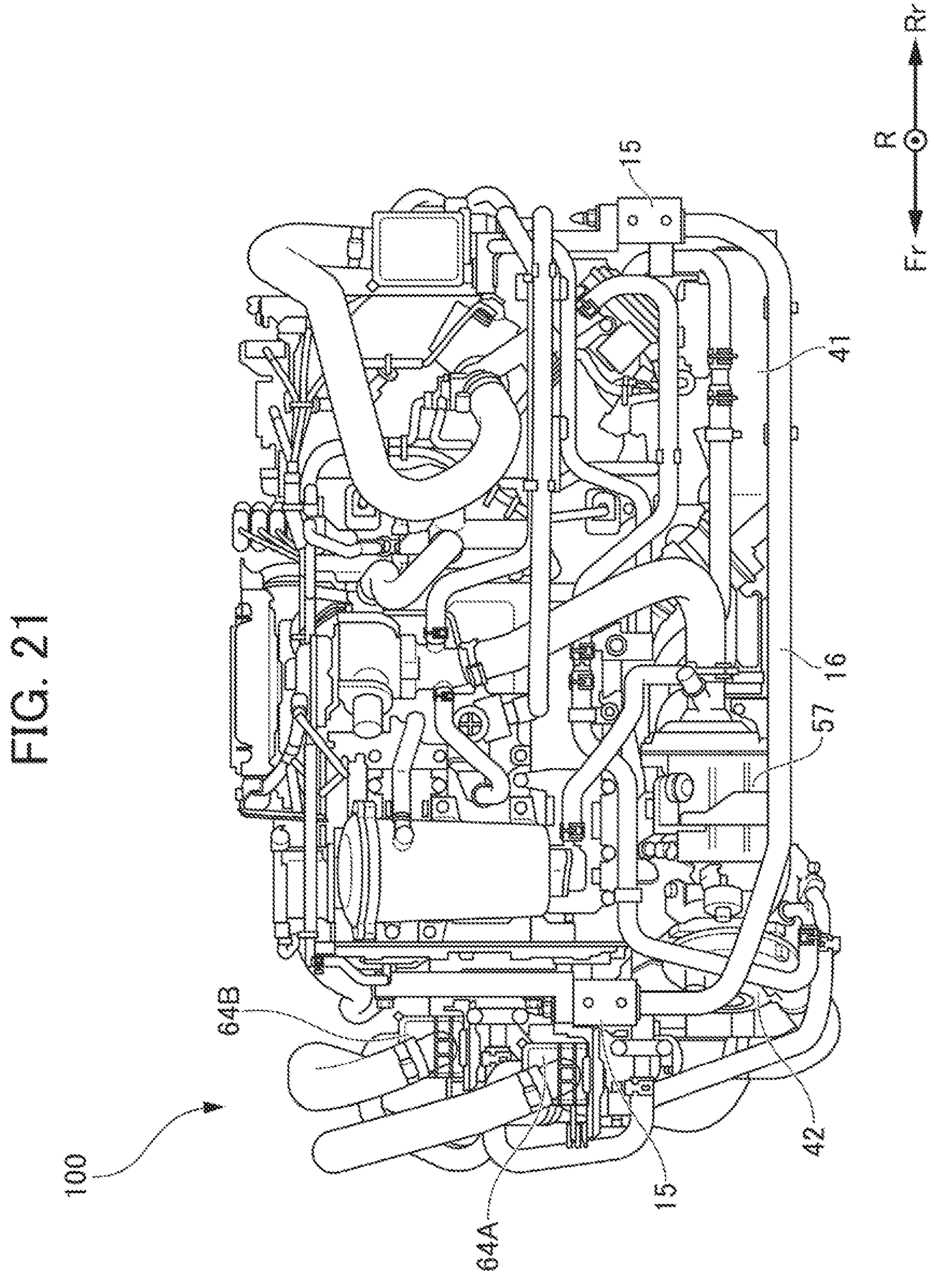
FIG. 21 is a side view showing the fuel cell system.

FIG. 21 is a side view looking at the fuel cell system 100 from the right R. The pump drive device 41, air pump 42, etc. are provided to the lower part of the fuel cell system 100.

FIG. 22 is a bottom view looking at FIG. 21 from below. Hereinafter, among the longitudinal direction and width direction of the air pump 42, the one having the smaller angle relative to the front/rear direction Fr, Rr is referred to as "pump axis direction 42*x*". In addition, hereinafter, among the longitudinal direction and width direction of the pump drive device 41, the one having a smaller angle relative to the front/rear direction Fr, Rr is referred to as "drive device axis direction 41*x*". The front/rear direction Fr, Rr, as mentioned previously, is the longitudinal direction of the fuel cell system 100. Therefore, the front/rear direction Fr, Rr may be substituted with "system axis direction", and left/right direction L, R may be substituted with "system width direction".

The air pump 42 and pump drive device 41 are arranged side by side in the front/rear direction Fr, Rr. More specifically, the air pump 42 is installed more to the front Fr than the pump drive device 41. The drive device axis direction 41 is the front/rear direction Fr, Rr. The pump axis direction 42*x* slopes relative to the front/rear direction Fr, Rr and drive device axis direction 41*x*.

The air pump 42 has a discharge port 42*b* which discharges air. At the left L side of this discharge port 42*b*, a predetermined portion 16*z* of the frame 16 exists. The pump axis direction 42*x* slopes relative to the front/rear direction Fr, Rr; therefore, the axis of the discharge port 42*b* and the extension line 42*b*L thereof slope relative to the left/right direction L, R. Interference between the extension line 42*b*L of this axis and this predetermined portion 16*z* of the frame 16 is thereby avoided.

Figure 23:
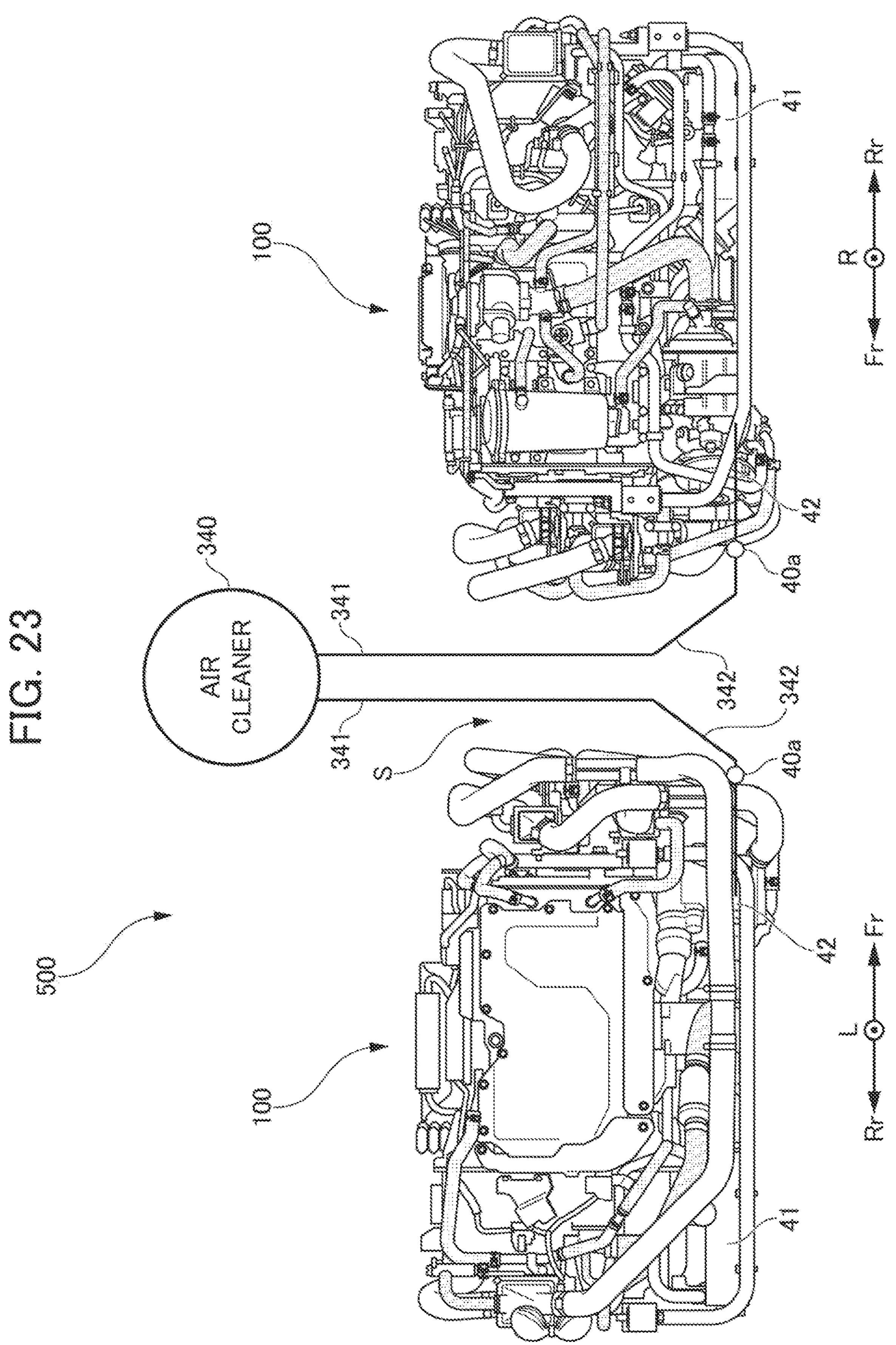
FIG. 23 is a side view showing a fuel cell system assembly.

FIG. 23 is a side view showing a fuel cell system assembly 500 of the present embodiment. The fuel cell system assembly 500 has an air cleaner 340 as well as two of the aforementioned fuel cell systems 100. The two fuel cell systems 100 are arranged side by side in the front/rear direction Fr, Rr with the front Fr sides facing each other.

Figure 24:
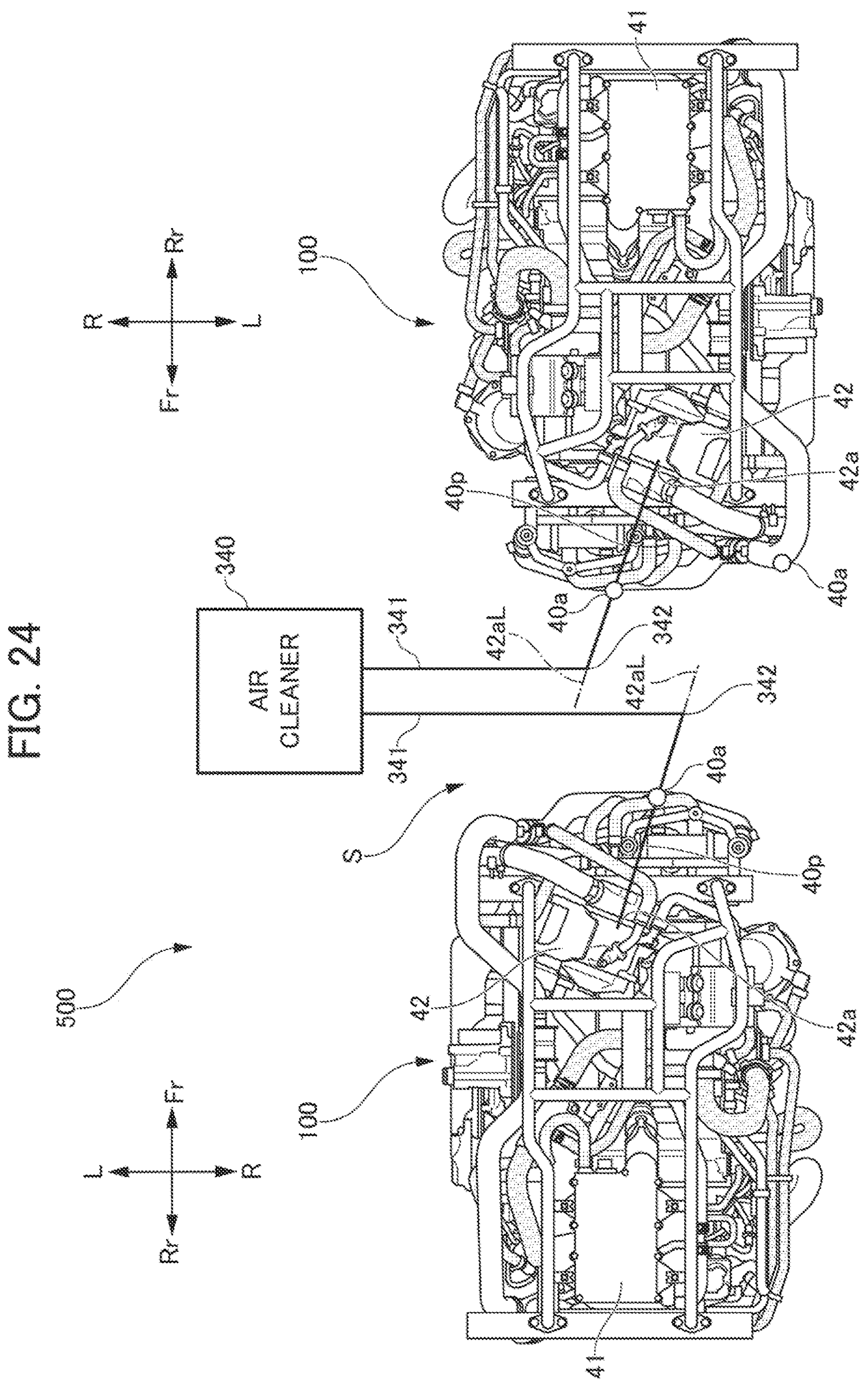
FIG. 24 is a bottom view showing a fuel cell system assembly.

FIG. 24 is a bottom view looking at FIG. 23 from below. In a bottom view, one fuel cell system 100 is a state achieved by rotating the other fuel cell system 100 by 180°. The two fuel cell systems 100 are thereby arranged side by side in the front/rear direction Fr, Rr with system spacing S in the front/rear direction Fr, Rr, so that the air pumps 42 approach each other more than the pump drive devices 41 approach each other.

Each pump 42 has a suction port 42*a* which suctions air at an end in the front Fr side, which is the system spacing S side. In the bottom view, the pump axis direction 42*x* slopes relative to the front/rear direction Fr, Rr; therefore, the axis of each suction port 42*a* and extension line 42*a*L thereof slopes relative to the front/rear direction Fr, Rr. In the system spacing S in the same bottom view, the extension lines 42*a*L of the axis of the second suction port 42*a* are offset. Then, relative to the suction port 42*a* of each air pump 42, one air cleaner 340 is connected via the air pipes 341, 40*p* extending through the system spacing S to each suction port 42*a*. It should be noted that the air pipes 341, 40*p* herein include the air supply pipe 341 linking the air cleaner 340 and cathode system intake port 40*a*, and a cathode system pipe 40*p* linking the cathode system intake port 40*a* and suction port 42*a*.

Hereinafter, the effects of the present embodiment will be summarized.

As shown in FIG. 1, there are the first cooling system 50 and second cooling system 60, the first cooling system 50 being used with the purpose of adjusting the temperature of the first cooling target to a predetermined target temperature, and the second cooling system 60 being used with the purpose of cooling the second cooling target to as low a temperature as possible, etc. Due to using the two cooling systems 50, 60 with different purposes in this way, the cooling systems 50, 60 are efficient.

As shown in FIG. 2, the two second heat exchangers 64A, 64B are arranged in parallel in the cathode system 40, and the cathode system 40 passes air in parallel through the two second heat exchangers 64A, 64B. For this reason, compared to a case of passing air through one second heat exchanger, or a case of passing air in series through two heat exchangers 64A, 64B, it is possible to suppress pressure loss, as shown in FIG. 3. Moreover, in the case of arranging the two second heat exchangers 64A, 64B in parallel, as differ from a case of arranging in series, the air cooled by the upstream second heat exchanger will not be further cooled by the downstream second heat exchanger. Thus, also in the aspect of heat exchange performance, superiority can be obtained as shown in FIG. 4. As described above, according to the parallel arrangement of the two second heat exchangers 64A, 64B, it is possible to suppress pressure loss of air in the cathode system 40, and improve the heat exchange performance of the second heat exchangers 64A, 64B.

As shown in FIG. 5, a plurality of the second heat exchangers 64A, 64B are arranged in series in the second cooling system 60, and the second cooling system 60 passes the cooling water in series through the plurality of second heat exchangers 64A, 64B. In other words, the plurality of heat exchangers 64A, 64B are arranged in parallel in the cathode system 40, while being arranged in series in the second cooling system 60. For this reason, it is ideal in the case of, while the cathode system 40 prioritizes pressure drop suppression of air, the second cooling system 60 prioritizes supplying the cooling water by few branches efficiently to the plurality of second heat exchangers 64A, 64B rather than pressure loss suppression of cooling water in the second cooling system 60.

As shown in FIG. 6, the two second heat exchangers 64A, 64B connected to the second radiator 360 are collectively arranged so as to approach. It is thereby possible to shorten the total length of pipe connecting the second radiator 360 and two second heat exchangers 64A, 64B. It is thereby possible to compactly arrange the second cooling system 60, and efficiently layout the cooling systems 50, 60.

More specifically, the two second heat exchangers 64A, 64B are installed more to the front Fr than the stack assembly 20. It is thereby possible to collectively arrange the two second heat exchangers 64A, 64B at the front part of the fuel cell system 100.

On the other hand, even if the first heat exchanger 54 connected to the first radiator 350 is separated from the two second heat exchangers 64A, 64B connected to the second radiator 360, the pipe of cooling water will not lengthen. In this regard, the first heat exchanger 54 is provided more to the rear Rr side than the stack assembly 20. In other words, the first heat exchanger 54 is arranged on the opposite side to the side on which the two second heat exchangers 64A, 64B are provided. It is thereby possible to effectively layout the first cooling system 50 and second cooling system 60 and avoid overcrowding.

As shown in the same FIG. 6, the second heat exchangers 64A, 64B are installed to be staggered from each other in the respective directions of up/down, front/rear and left/right. Therefore, the length of the cathode system pipe 40*p* from the air branching part 43 to each second heat exchanger 64A, 64B, and the length of the cathode system pipe 40*p* from each second heat exchanger 64A, 64B to the air merging part tend to be sufficiently secured without hardship. Furthermore, by staggering in each of these directions, the length of the cathode system pipe 40*p* on the side of one second heat exchanger 64A and the length of the cathode system pipe 40*p* on the side of the other second heat exchanger 64B can be equalized without hardship, or adjusted to the desired lengths without hardship. It is thereby possible to suppress the two cathode system pipes 40*p* branching and extending from the air branching part 43, and the two cathode system pipes 40*p* merging at the air merging part 45 bending at an unreasonable angle. For this reason, it is possible to efficiently layout the cathode system pipe 40*p* without impairing the manufacturability of the fuel cell system 100, and increasing the pressure loss of air.

More specifically, the distances along the cathode system pipe 40*p* from the air branching part 43 to each second heat exchanger 64A, 64B are equal to each other. For this reason, it is possible to efficiently equalize the pressure drop of air from the air branching part 43 to each second heat exchanger 64A, 64B. In addition, the distances along the cathode system pipe 40*p* from each second heat exchanger 64A, 64B to the air merging part 45 are equal to each other. For this reason, it is possible to efficiently equalize the pressure drop of air from each second heat exchanger 64A, 64B to the air merging part 45. In addition, the distances along the cathode system pipe 40*p* from the air branching part 43 through each heat exchanger 64A, 64B to the air merging part 45 are equal to each other. For this reason, it is possible to efficiently equalize the pressure drop of air in each path.

In the side view shown in FIG. 13, the stack assembly 20 is surrounded from at least the three sides of both sides in front and rear and the lower side, by the front and rear brackets 15 and frame 16. For this reason, the stack assembly 20 is protected from impact such as collision, by the front/rear brackets 15 and frame 16. Furthermore, in the same side view, at least a predetermined portion of the electrical devices 41, 42, 57 is surrounded from the four sides of both front/rear sides and both upper/lower sides, by the frames 16 and stack assembly 20. For this reason, this predetermined portion of the electrical devices 41, 42, 57 is further protected from strong impact.

Furthermore, not only in a side view, but also in the front view shown in FIG. 14, at least this predetermined portion of the electrical devices 41, 42, 57 is surrounded from the four sides of both left/right sides and both upper/lower sides by the frame 16 and stack assembly 20. For this reason, this predetermined portion of the electrical devices 41, 42, 57 is more strongly protected.

Furthermore, not only in the side view and front view, but also in the bottom view shown in FIG. 22, at least this predetermined portion of the electrical devices 41, 42, 57 is surrounded from the four sides of both left/right sides and both front/rear sides by the frame 16 and bracket 15. For this reason, this predetermined portion of the electrical devices 41, 42, 57 is more strongly protected.

The electrical device 41, 42, 57 referred to herein includes the pump drive device 41, air pump 42 and water pump 57. Therefore, more specifically, it is possible to protect the pump drive device 41, air pump 42 and water pump 57 from impact strongly.

As shown in FIG. 16, etc., the stack 22 is surrounded by the cooling system pipes 50*p*, 60*p*, and a portion of the cooling system pipes 50*p*, 60*p* surrounding the stack 22 is surrounded by the cathode system pipe 40*p*. For this reason, during impact or the like, first, external force is absorbed by the cathode system pipe 40*p* which tends to be formed flexibly and in large diameter, which is at the outer side, and following this, external force is absorbed by the cooling system pipes 50*p*, 60*p* which tend to be formed hard and in small diameter, which is at the inner side. It is thereby possible to efficiently suppress external force on the stack 22 having a fuel cell. For this reason, it is possible to efficiently improve the impact resistance of the fuel cell.

More specifically, as shown in FIGS. 17 to 19, in all of the side view, bottom view and front view, the stack 22 is surrounded by the cooling system pipes 50*p*, 60*p* from at least three sides, and a portion of the cooling system pipes 50*p*, 60*p* surrounding the stack 22 is surrounded by the cathode system pipe 40*p* from at least three sides. It is thereby possible to more reliably improve the impact resistance of the fuel cell.

In addition, actually, the cathode system pipe 40*p* is made of a flexible material including at least one among resin and rubber, and the cooling system pipes 50*p*, 60*p* are made of metal. For this reason, during impact or the like, first, external force is absorbed by the cathode system pipe 40*p* made of a flexible material, and following this, external force is absorbed by the cooling system pipes 50*p*, 60*p* which are made of metal. It is thereby possible to more efficiently suppress external force on the fuel cell.

As shown in FIG. 20, the respective ports of the anode system intake port 30*a*, cathode system intake port 40*a*, cathode system exhaust port 40*b*, cooling system inflow ports 50*a*, 60*b*, and cooling system outflow ports 50*b*, 60*b* are all provided to the system side face. In other words, these respective ports are collected at the system side face, without being provided to the upper face or bottom face of the fuel cell system 100. The layout to each port thereby becomes easy. In addition, an arrangement vertically overlapping the fuel cell system 100 becomes easy. Furthermore, by providing each port at the system side face, it is possible to compactly consolidate respective wires to the fuel cell system 100, compared to a case of providing a connector to a side of the fuel cell system 100. According to the above, the mountability of the fuel cell system 100 to an electric vehicle improves.

The cooling systems 50, 60 have the first cooling system inflow port 50*a*, the second cooling system inflow port 60*a* separate from this, the first cooling system outflow port 50*b*, and the second cooling system outflow port 60*b* separate from this. The respective ports including these are all provided at the system side face. For this reason, even such a case of the cooling systems 50, 60 having the first cooling system 50 and second cooling system 60, it is possible to improve the mountability of the fuel cell system 100.

The respective ports of the anode system intake port 30*a*, cathode system intake port 40*a*, cathode system exhaust port 40*b*, first cooling water inflow port 50*a*, first cooling system outflow port 50*b*, second cooling water inflow port 60*a*, and second cooling system outflow port 60*b* are distributed on at least three surfaces among the four surfaces as system side surfaces. For this reason, it is possible to suppress crowding of wiring to each port.

Furthermore, at the system side face, the pump drive device 41 has the power receiving port 41*e* which receives electricity from outside of the fuel cell system 100 in the system side face. For this reason, the power receiving port 41*a* of the pump drive device 41 can be collectively arranged at the system side face along with the respective other ports.

Furthermore, the voltage transformer 19 has the power receiving port 19*e* which receives electricity from outside of the fuel cell system 100. For this reason, the power receiving port 19*e* of the voltage transformer 19 can be collectively arranged at the system side face along with the respective other ports.

In the bottom view shown in FIG. 22, the pump axis direction 42*x* slopes relative to the front/rear direction Fr, Rr and the drive device axis direction 41*x*. For this reason, compared to a case of not sloping, the power wiring E which electrically links the pump drive device 41 and pump 42 tends to naturally bend. By this bending, error, etc. in the length precision of the power wiring E tends to be absorbed. For this reason, the manufacturability of the fuel cell system 100 improves.

The pump drive device 41 tends to be larger than the pump 42. In this point, the drive device axis direction 41*x*, which is the axis direction of the pump drive device 41, is the front/rear direction Fr, Rr, which is the system axis direction; therefore, compared to a case of sloping relative to the front/rear direction Fr, Rr, the pump drive device 41 tends to compactly fit within the fuel cell system 100.

The axis of the discharge port 42*b* of the air pump 42 slopes relative to the left/right direction L, R which is the system width direction, whereby interference between the extension line 42*b*L of the axis of the discharge port 42*b* and the predetermined portion 16*z* of the frame 16 is avoided. For this reason, it is possible to avoid interference between the cathode system pipe 40*p* and this predetermined portion 16*z* of the frame 16, without bending the cathode system pipe 40*p* connected to the discharge port 42*b*. For this reason, it is possible to efficiently layout the air pump 42 within the fuel cell system 100.

Figure 25:
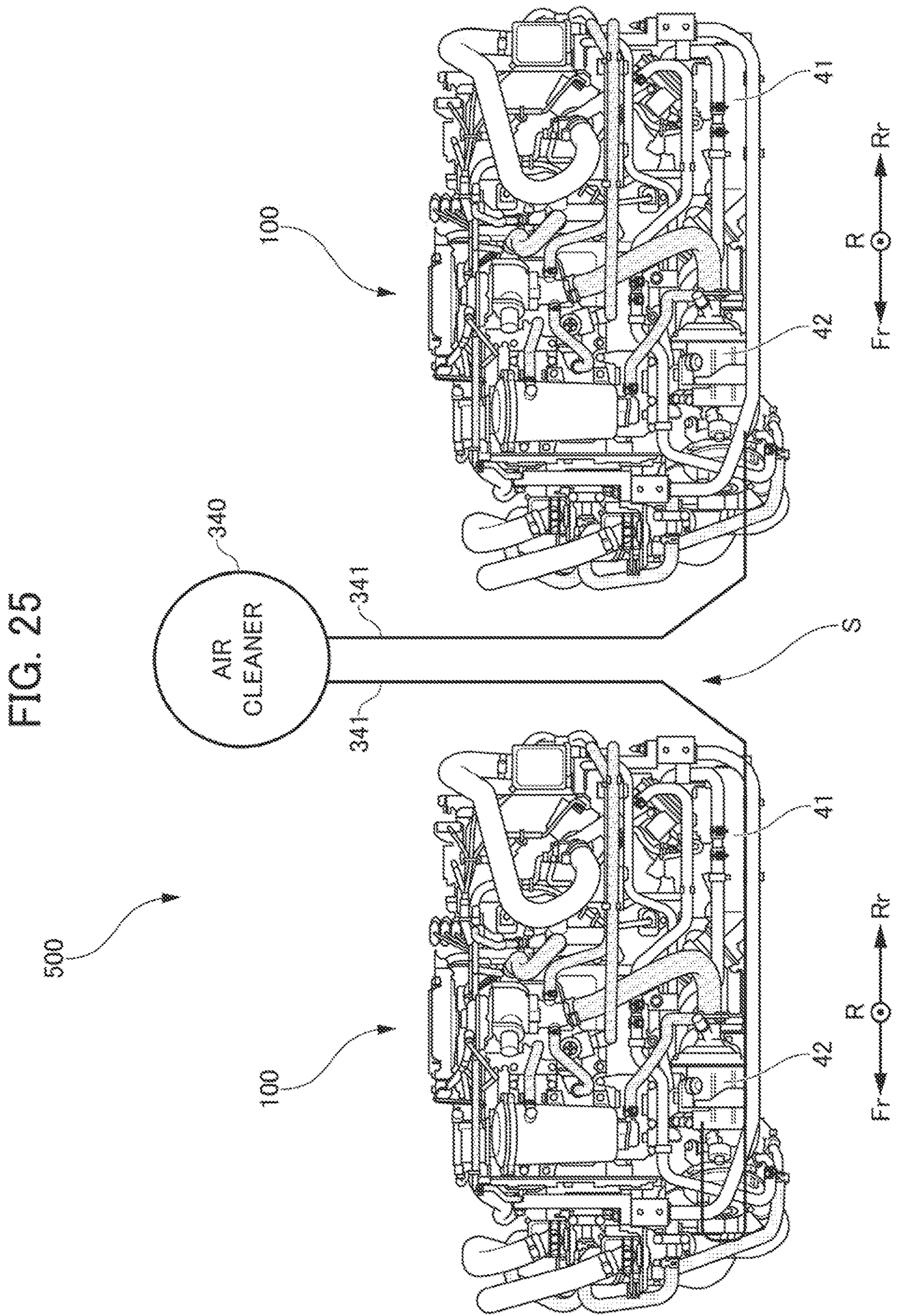
FIG. 25 is a side view showing the fuel cell system assembly of a modified example.
Figure 26:
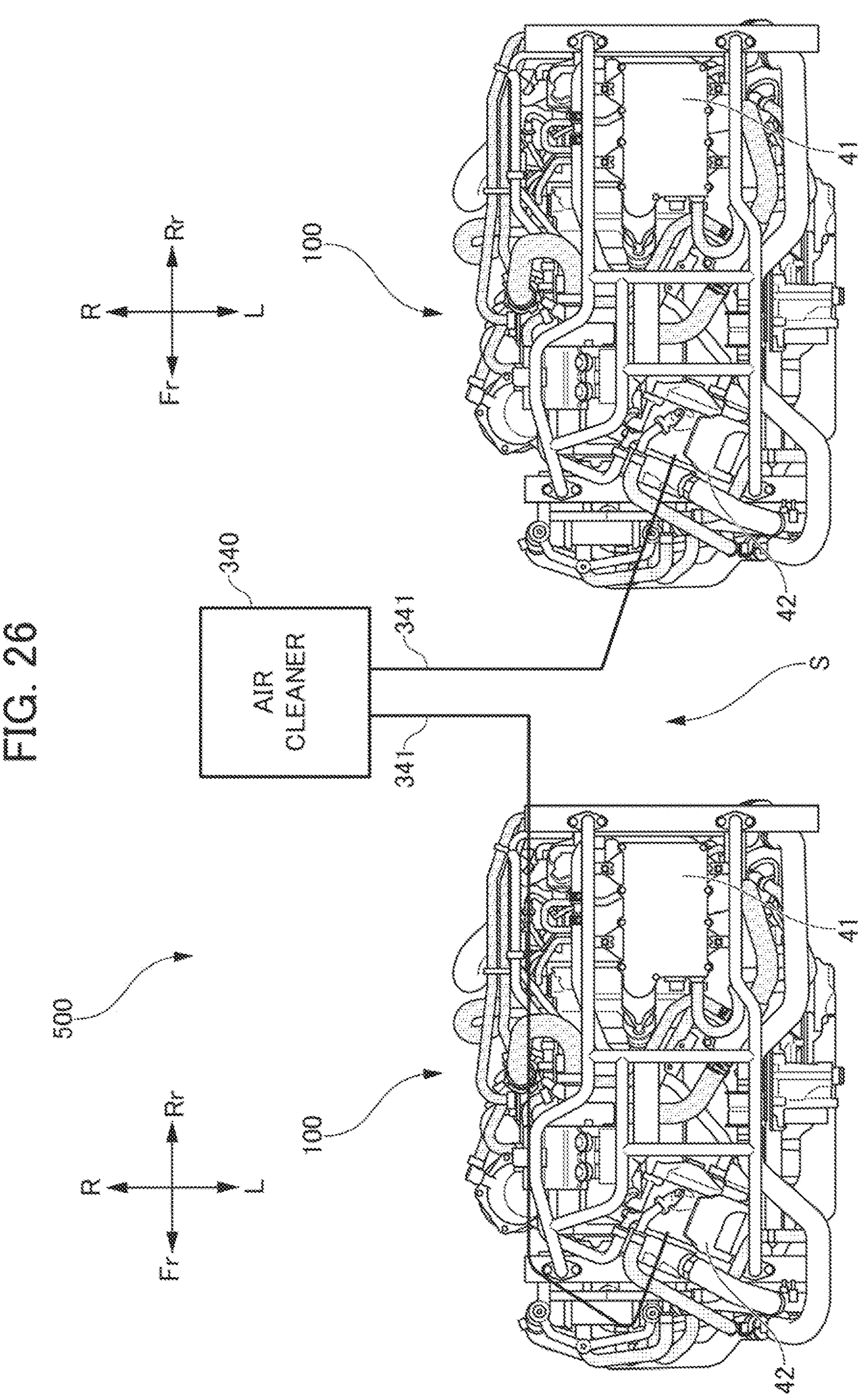
FIG. 26 is a bottom view showing the fuel cell system assembly of a modified example.

As in the case of the modified example shown in FIG. 25, in the case of arranging two fuel cell systems 100 in the same direction and, as shown in FIG. 26, providing the air cleaner 340 right beside the system spacing S, the length of the air pipe from the air cleaner 340 to each pump 42 will differ. There is thereby concern over the pressure drop of air differing, and the performance of each fuel cell system 100 coming to differ.

In this point, with the present embodiment, as shown in FIG. 24, the two fuel cell systems 100 are arranged so as to oppose the front Fr sides, and the air pumps 42 approach each other. Relative to these respective air pumps 42, one air cleaner 340 is connected via the air pipe extending through the system spacing S to each air pump 42. For this reason, the distances and pressure drops from one air cleaner 340 to each air pump 42 tend to equalize. For this reason, the performance of each fuel cell system 100 tends to equalize.

Moreover, in the system spacing S, the extension lines 42*a*L of the axis of the suction port 42*a* of the two air pumps 42 are offset. Due to this, a handling part 342 of the air pipe linking the air cleaner 340 and one air pump 42, and the handling part 342 of the air pipe linking the air cleaner 340 and the other air pump 42 are offset from each other. For this reason, it is possible to avoid interference between handling parts 342, and efficiently layout the air pipes on both sides. It is thereby possible to decrease the system spacing S in the front/rear direction Fr, Rr, and compactly consolidate the fuel cell system assembly 500 in the front/rear direction Fr, Rr.

It should be noted that, in the bottom view shown in FIG. 22, the angle of the pump axis direction 42*x* relative to the drive device axis direction 41*x* is not particularly limited; however, so that the above effects are more reliably obtained, it is preferably at least 5°, more preferably at least 10°, and even more preferably at least 15°. On the other hand, from the aspect of mountability of the air pump 42 to the fuel cell system 100, this angle is preferably no more than 45°, more preferably no more than 40°, and even more preferably no more than 35°.

Modified Embodiment

The above embodiment can be implemented by modifying in the following way, for example. The anode system 30 may be configured so as to supply fuel gas other than hydrogen such as natural gas to the anode electrode, for example. The cathode system 40 may be configured so as to supply oxidant gas other than air such as oxygen to the cathode electrode, for example. Each cooling system 50, 60 may be configured so as to use a coolant other than cooling water such as ethylene glycol or oil, for example.

The first cooling system 50 may have a plurality of first heat exchangers 54. The second cooling system 60 may have three or more second heat exchangers.

The fuel cell system 100 may be equipped to a mounting target other than an electric vehicle. More specifically, this mounting target may be a mobile object other than an electric vehicle such as a ship or drone, or may be a fixture.

EXPLANATION OF REFERENCE NUMERALS

15 bracket as connector
16 frame
16*a* frame first part
16*b* frame second part
20 stack assembly
22 stack
30 anode system
30*a* anode system intake port
30*p* anode system pipe
40 cathode system
40*a* cathode system intake port
40*b* cathode system exhaust port
40*p* cathode system pipe
41 pump drive device
41*x* drive device axis direction
42 air pump
42*a* suction port
42*a*L extension line of axis of suction port
42*b* discharge port
42*b*L extension line of axis of discharge port
42*x* pump axis direction
50 first cooling system
50*a* first cooling system inflow port
50*b* first cooling system outflow port
54 first heat exchanger
57 water pump as coolant pump
60 second cooling system
60*a* second cooling system inflow port
60*b* second cooling system outflow port
64A one second heat exchanger
64B other second heat exchanger
100 fuel cell system
350 first radiator
360 second radiator
500 fuel cell system assembly
Fr front as longitudinal direction and system axis direction of fuel cell system
Rr rear as longitudinal direction and system axis direction of fuel cell system
L left as width direction and system width direction of fuel cell system
R right as width direction and system width direction of fuel cell system

What is claimed is:

1. A fuel cell system comprising: a stack in which fuel cells are laminated; an anode system which supplies fuel gas to the stack; a cathode system which supplies oxidant gas to the stack; and a cooling system, wherein the cooling system includes a plurality of heat exchangers which exchange heat between the oxidant gas and coolant, and each of the heat exchangers is a member independent from another of the heat exchangers, wherein a plurality of the heat exchangers is disposed in parallel in the cathode system, and the cathode system includes a branching part which is more to an upstream side than each of the heat exchangers, and includes a merging part which is more to a downstream side than each of the heat exchangers, and wherein the heat exchangers are installed to be shifted from each other in each direction of a vertical direction, a front/rear direction as a longitudinal direction of the fuel cell system in a top view, and a left/right direction as a horizontal direction orthogonal to the front/rear direction.

2. The fuel cell system according to claim 1, wherein distances from the branching part to each of the heat exchangers along a pipe of the cathode system are equal to each other.

3. The fuel cell system according to claim 1, wherein distances from each of the heat exchangers to the merging part along a pipe of the cathode system are equal to each other.

4. The fuel cell system according to claim 1, wherein distances from the branching part through each of the heat exchangers to reaching the merging part along a pipe of the cathode system are equal to each other.

* * * * *